(12) United States Patent
Scharber et al.

(10) Patent No.: US 9,094,464 B1
(45) Date of Patent: Jul. 28, 2015

(54) CONNECTION DIGEST FOR ACCELERATING WEB TRAFFIC

(71) Applicant: Limelight Networks, Inc., Tempe, AZ (US)

(72) Inventors: John Scharber, Placerville, CA (US); Jacob Roersma, Ada, MI (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 14/575,285

(22) Filed: Dec. 18, 2014

(51) Int. Cl.
  *G06F 15/177* (2006.01)
  *H04L 29/08* (2006.01)
(52) U.S. Cl.
  CPC ............ *H04L 67/2842* (2013.01); *H04L 67/10* (2013.01); *H04L 67/327* (2013.01)
(58) Field of Classification Search
  None
  See application file for complete search history.

(56) References Cited

U.S. PATENT DOCUMENTS

| | | | |
|---|---|---|---|
| 6,351,743 B1 | 2/2002 | DeArdo et al. | |
| 8,447,837 B2 | 5/2013 | Devanneaux et al. | |
| 8,725,837 B2 | 5/2014 | Pacella et al. | |
| 8,745,262 B2 | 6/2014 | Kohli et al. | |
| 8,792,510 B2 | 7/2014 | Yong et al. | |
| 8,863,204 B2 | 10/2014 | Whyte et al. | |
| 2012/0096106 A1 | 4/2012 | Blumofe et al. | |

FOREIGN PATENT DOCUMENTS

CN 102868753 A 1/2013

OTHER PUBLICATIONS

De Cicco, L., et al., "Towards cost-effective on-demand continuous media service: a peer-to-peer approach", Retrieved on Jan. 28, 2015 from http://docs.lib.purdue.edu/cgi/viewcontent.cgi?article=2571& context=cstech.pdf, 2003, 19 Pages, Department of Computer Science Purdue University.

*Primary Examiner* — Ranodhi Serrao
(74) *Attorney, Agent, or Firm* — Kilpatrick Townsend & Stockton, LLP

(57) ABSTRACT

In various aspects, provided herein are systems, methods and computer-program products for delivering content objects over the Internet from a content delivery network to end-user systems. The systems, methods and products described herein optionally utilize one or more techniques for reducing the delay associated with obtaining non-cached content objects from their respective origin servers, including by re-using existing open connections, by making use of a TCP hand-off technique and by transmitting updates to system digests simultaneous with the exchange of keepalive signals between servers.

19 Claims, 18 Drawing Sheets

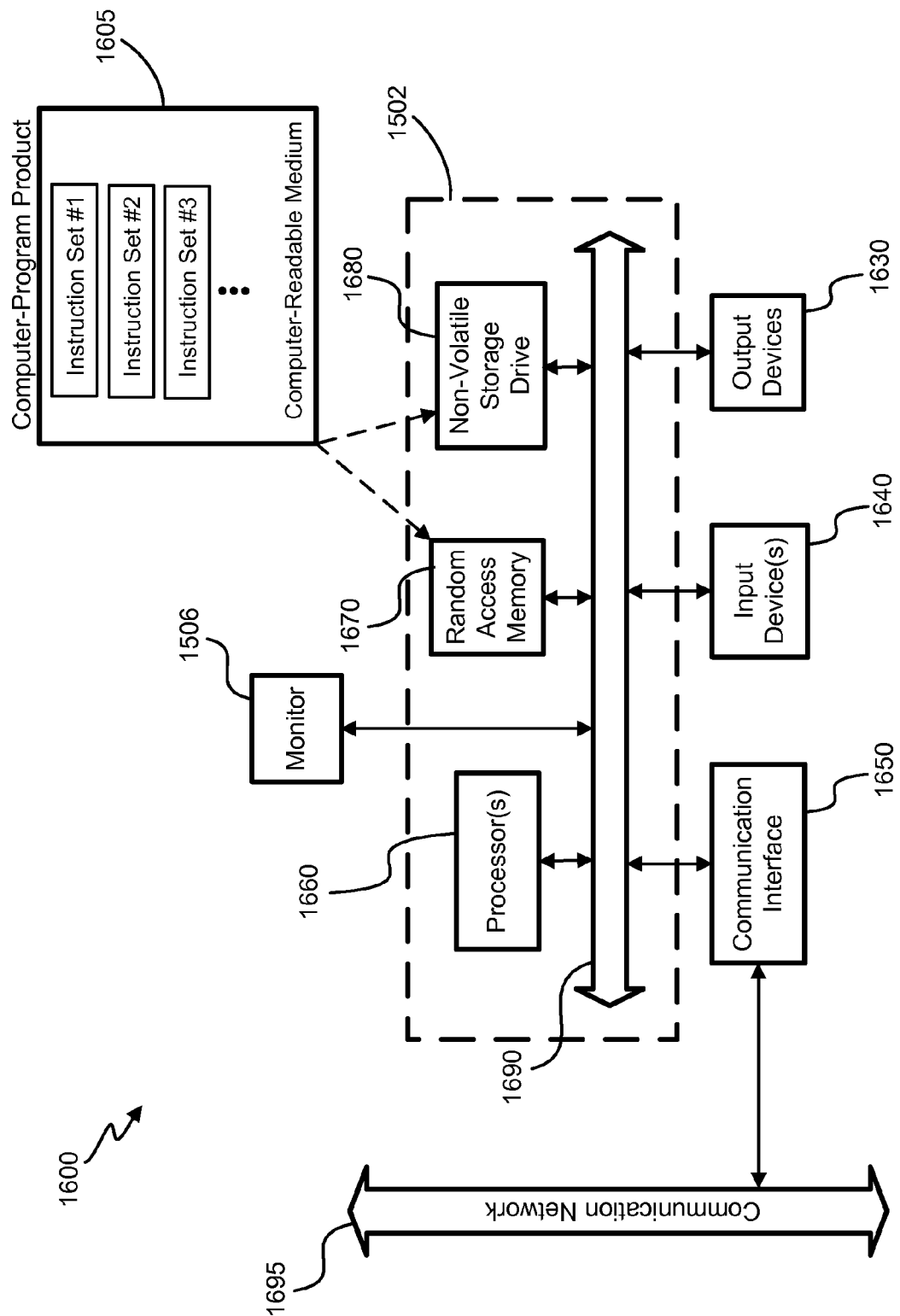

CONNECTION DIGEST FOR ACCELERATING WEB TRAFFIC

CROSS-REFERENCE TO RELATED APPLICATIONS

Not applicable

FIELD

This disclosure relates in general to content delivery over the Internet and, but not by way of limitation, to content delivery networks, amongst other things.

BACKGROUND

Content delivery networks (CDNs) have a geographically distributed network of points of presence (POPs) such that one is likely to be close to an end user. A request for content is matched to a nearby POP using routing, domain name service (DNS) diversion, redirection, Anycast and/or other techniques. An edge server in the POP generally serves the content from a cache of the edge server, a host within the CDN or an origin server depending on where the content is located. For content that is missing from the CDN, the request to the origin server can be costly in terms of quality of service (QoS). There remains a further need for improving the QoS associated with caching and delivery of content that is missing from the CDN.

SUMMARY

In various aspects, provided herein are systems and methods for delivering content objects over the Internet from a content delivery network to end-user systems. In a related aspect, computer-program products are provided, such as a product tangibly embodied in a non-transitory machine-readable storage medium with instructions configured to cause a computing device to perform any of the methods described herein. The systems, methods and products described herein optionally utilize one or more techniques for reducing the delay associated with obtaining non-cached content objects from their respective origin servers, including by re-using existing open connections, making use of TCP hand-off and updating a system digest simultaneous with the exchange of keepalive signals between servers.

In order to provide a high QoS for serving content objects to end-user systems, it is desirable to minimize the time necessary for delivery of a content object to an end-user system requesting the content object. If the content object is not cached by a CDN that is tasked with delivery of content objects to the end-user system, the CDN may need to obtain a copy of the content objects from an origin server. Establishing a new connection between a server within the CDN and an origin server takes time, thus reducing the QoS for delivery of the requested content objects. Establishing a new connection is slowed by the transmission control protocol's (TCP's) "three-way handshake." In order to establish a new connection, a SYN signal is sent from the system requesting the connection. The receiving system replies with a SYN-ACK signal, indicating the request was received and requesting that the return connection is established. These first two steps of the three-way handshake establish the connection between the requesting system and the receiving system. Finally an ACK signal is sent from the requesting system to the receiving system. The last two steps of the three-way handshake establish the return connection between the receiving system and the requesting system, setting up a full-duplex communication channel. This exchange may reduce the QoS for transferring content objects between systems versus using an already established connection.

In addition, as a new connection is established, the TCP window size may be relatively small as the systems establish that the connection is reliable and error-free. Use of a small TCP window size may further increase the time needed for the transfer of a content object from one system to another and reduce the QoS for serving the content object to an end-user system. As a connection is used, however, larger TCP windows are typically negotiated between servers, allowing for more efficient transfer of data. For connections that have been established and used for a significant lengths of time, the TCP window may be at a relatively large and/or maximum size, providing a further advantage for re-use of existing connections in that data can be transferred more efficiently from one end of the existing connection to the other end when compared to the data transfer over a new connection.

To maximize the gains from re-use of existing open connections between servers, a connection digest is optionally established that provides an easy mechanism for look-up of existing open connections with various origin servers. In addition to providing a list of open connections, the connection digest optionally includes further information about the quality of the connections. For example, in one embodiment, the connection digest includes information about the size of the TCP window of the existing connections, allowing for straightforward comparison of two existing connections between a single origin server, such as may established between the origin server and two separate servers within a POP or a CDN. Such a configuration, for example, allows for preferential selection of one existing connection over another existing connection.

In one embodiment, a system for delivering content objects over the Internet from a content delivery network to end-user systems comprises a first server, wherein the first server is configured to receive a request for a content object, determine that the content object is not cached by the first server, determine that the content object is to be requested from an origin server and determine that the first server either has no open connection with the origin server or that the first server has an open connection with the origin server with limited performance; and a cache for storing a connection digest, wherein the connection digest tracks connection information of a second server with the origin server. Optionally, a system of this aspect further comprises the second server. In embodiments, the first server is further configured to query the connection digest and receive from the query a result identifying that the second server has an open connection with the origin server. Optionally, the first server is further configured to transfer the request for the content object to the second server based on the result from the connection digest. Optionally, the first server is further configured to retrieve the content object from the origin server using the open connection of the second server with the origin server. In one embodiment, the second server is configured to retrieve the content object from the origin server using the open connection of the second server with the origin server.

In another embodiment, a method for delivering content objects over the Internet from a content delivery network to end-user systems comprises receiving a request at a first server to deliver a content object to an end-user system, determining that the first server does not have the content object cached; determining that the content object is to be requested from an origin server; determining that the first server either has no open connection with the origin server or that the first server has an open connection with the origin server with limited performance; querying a connection digest and receiving a result from the query that identifies a second server as having an open connection with the origin server. Optionally, a method of this aspect further comprises transferring the request for the content object to the second server based on the result from the query. Optionally, a method of this aspect further comprises caching the content object on the first server or the second server. Optionally, a method of this aspect further comprises retrieving the content object from the origin server using the open connection of the second server with the origin server and serving the content object to the end-user system. In exemplary embodiments, retrieving the content object is performed in a shorter time than a time required for retrieving the content object from the origin server by opening new connection between the origin server and the first server or by using the open connection of the first server with the origin server with limited performance.

In an embodiment, for example, the request received by a first server is to deliver the content object to an end-user system. Optionally, the request is from an end-user system. In some embodiments, the first server is one of a first plurality of servers in a first content delivery network having a first plurality of points of presence (POPs), the first content delivery network delivers content over the Internet to end-user systems, the second server is one of a second plurality of servers in a second content delivery network having a second plurality of POPs and the second content delivery network delivers content over the Internet to end-user systems. Optionally, the first content delivery network and the second content delivery network are the same, the first plurality of POPs and the second plurality of POPs are the same or the first plurality of servers and the second plurality of servers are the same. In an exemplary embodiment, the first content delivery network and the second content delivery network are federated content delivery networks.

In various embodiments, a connection digest comprises a database. Optionally, a connection digest includes one or more of entries indicating open connections between the origin server and each of the first plurality of servers and/or the second plurality of servers, entries indicating a quality of open connections between the origin server and each of the plurality of servers and entries indicating a TCP window size between each of the plurality of servers and the origin.

Alternative or additional to the above described use of connection digests, various servers, referred to herein as acceleration nodes, within a content delivery network may maintain persistent open connections with specific origin servers. For these embodiments, it is possible to transfer all requests for obtaining content objects from a specific origin server to a particular acceleration node to take advantage of the acceleration node's persistent open connection with the specific origin server. Such a configuration can further enhance the QoS for delivery of non-cached content objects by providing a known and permanent, consistent or infrequently changing connection for obtaining the non-cached content objects from their respective origin servers.

In embodiments, for example, a system for delivering content objects over the Internet from a content delivery network to end-user systems comprises a first server, wherein the first server is configured to receive a request for a content object, determine that the content object is not cached by the first server, determine that the content object is to be requested from an origin server, determine that the first server either has no open connection with the origin server or that the first server has an open connection with the origin server with limited performance and transfer the request for the content object to a second server that has an open connection with the origin server. In an exemplary embodiment, the second server maintains a persistent open connection with the origin server. Optionally, the first server is further configured to retrieve the content object from the origin server using the open connection of the second server with the origin server. Optionally, a system of this aspect further comprises the second server, such as where the second server is configured to receive transferred requests to obtain content objects from the origin server, for example using the open connection of the second server with the origin server.

In another embodiment, a method for delivering content objects over the Internet from a content delivery network to end-user systems comprises receiving a request to deliver a content object to an end-user system, determining that the first server does not have the content object cached, determining that the content object is to be requested from an origin server, determining that the first server either has no open connection with the origin server or that the first server has an open connection with the origin server with limited performance; and transferring the request for the content object to a second server having an open connection with the origin server. Optionally, the second server maintains a persistent open connection with the origin server. Methods of this aspect optionally further comprise retrieving the content object from the origin server using the open connection of the second server with the origin server and serving the content object to the end-user system. In one embodiment, the content object is cached on the first server or the second server. In exemplary embodiment, requests received at a plurality of first servers for content objects to be requested from the origin server are transferred to the second server. For example, in an embodiment, the second server receives, from a plurality of first servers, transferred requests for content objects to be requested from the origin server.

In an embodiment, for example, the request received by the first sever is to deliver a content object to an end-user system. Optionally, the request is from an end-user system. In various embodiments, the first server is one of a first plurality of servers in a first content delivery network having a first plurality of points of presence (POPs), the first content delivery network delivers content over the Internet to end-user systems, the second server is one of a second plurality of servers in a second content delivery network having a second plurality of POPs and the second content delivery network delivers content over the Internet to end-user systems. Optionally, the first content delivery network and the second content delivery network are the same, the first plurality of POPs and the second plurality of POPs are the same or the first plurality of servers and the second plurality of servers are the same. Optionally, the first content delivery network and the second content delivery network are federated content delivery networks.

An additional technique that can be employed by a content delivery system uses a technique referred to as TCP hand-off (TCPHA). TCPHA is beneficial in systems where a front-end node connects to a plurality of back-end nodes through a single switch. Such a configuration is implemented by a content delivery system for improving the spatial locality of cached objects by configuring a front-end server to handle requests for various content objects and forward the requests to multiple back-end servers for actual delivery of the requested content objects. In one embodiment, the back-end servers are configured for delivery of specific content object types (e.g., back-end servers for HTML files, back-end servers for image files, back-end servers for multimedia files). In another embodiment, the back-end servers are configured for delivery of content objects from a particular origin server (e.g., back-end servers for video content, back-end servers for media content, etc.). Other configurations are possible, such as where the back-end servers are configured as network attached file storage servers. Since the front-end server is handling multiple requests and forwarding them to potentially hundreds of back-end servers, a situation may occur where a large number of back-end servers simultaneously respond to the front-end server. This situation may overfill the switch buffer space, resulting in packet loss and TCP network collapse, a situation referred to as TCP incast. Some aspects described herein utilize the TCPHA technique for the requests forwarded by front-end server to the back-end servers.

In one embodiment, a system for delivering content objects over the Internet from a content delivery network to end-user systems comprises a front-end server, such as an edge server, wherein the front-end server is configured to receive a request for a content object, determine that none of a plurality of back-end servers have the content object cached and determine that the content object is to be requested from an origin server, and a cache for storing a connection digest. In an exemplary embodiment, the front-end server is further configured to query the connection digest, receive from the query a result identifying that a first back-end server, such as a file storage server, has an open connection with the origin and hand-off the request for the content object to the first back-end server. Optionally, the first back-end server is configured to receive transferred requests from the front-end server for the content object from the origin server, cache the content object from the origin server and serve the content object to the end-user system. Optionally, a system of this aspect further comprises the plurality of back-end servers. In an exemplary embodiment, the connection digest tracks connection information for each of the plurality of back-end servers with the origin server.

In an exemplary embodiment, the front-end server is further configured to exchange keepalive signals with each of the plurality of back-end servers for maintaining open connections between the front-end server and each of the plurality of back-end servers. In a specific embodiment, the keepalive signals include updates to the connection digest. Optionally, the front-end server is further configured to update the connection digest with the updates included with the keepalive signals.

In another embodiment, a method for delivering content objects over the Internet from a content delivery network to end-user systems comprises receiving a request to deliver a content object to an end-user system, determining that none of a plurality of back-end servers, such as a plurality of file storage servers, have the content object cached, determining that the content object is to be requested from an origin server, querying a connection digest that tracks connection information for each of the plurality of back-end servers, receiving a result from the query that identifies a first back-end server as having an open connection with the origin server and handing-off the request for the content object to the first back-end server. As will be understood by the skilled artisan, the phrase "handing-off the request for a content object to a back-end server" includes handing off the client TCP connection and request to another server, for example, such that the entire TCP connection, session and/or HTTP request are handed off to the back-end server. Optionally, a method of this aspect further comprises caching the content object from the origin server on one or more of the plurality of back-end servers and serving the content object to the end-user system.

In a specific embodiment, keepalive signals are exchanged between the front-end server and each of the plurality of back-end servers for maintaining open connections between the front-end server and each of the plurality of back-end servers. In an exemplary embodiment, the keepalive signals include updates to the connection digest. Optionally, a method of this aspect further comprises updating the connection digest with the updates included with the keepalive signals.

In various embodiments, the request received at the front end server is to deliver the content object to an end-user system. Optionally, the request is from an end-user system. In exemplary embodiments, the front-end server and the plurality of back-end servers are part of a content delivery network having a plurality of points of presence (POPs) and the content delivery network delivers content over the Internet to end-user systems. In an exemplary embodiment, the front-end server is an edge server and each of the plurality of back-end servers are storage servers. In embodiments, a front-end server receives requests from end-user systems for a content object and forwards or hands-off the requests to an appropriate back-end server. In embodiments, a back-end server receives forwarded or handed-off requests from a front-server and serves a requested content object to an end-user system.

In exemplary embodiments of the above aspects that update a connection digest, the updates to the connection digest comprise a complete copy of connection information for one or more of the plurality of back-end servers or the updates to the connection digest comprise an incremental copy of changes to the connection information for one or more of the plurality of back-end servers.

In another embodiment, a system for delivering content objects over the Internet from a content delivery network to end-user systems comprises a front-end server and a plurality of back-end servers, with the front-end server connecting to each of the plurality of back-end servers through a switch. Optionally, the front-end server is configured to receive multiple requests for a content object, determine one or more back-end servers to hand-off the multiple requests for the content object to and hand-off at least a portion of the request for the content object to a first back-end server. Optionally, the system further comprises the switch. In an exemplary embodiment, the content object is cached on the first back-end server and the first back-end server is configured to serve the content object to the end-user systems via a route that does not pass through the switch. Optionally, the plurality of back-end servers is configured such that the content object is not served through the switch.

In exemplary embodiments, the front-end server is configured to send a signal to a second back-end server to cache the content object when a load of the first back-end server exceeds a first threshold load and hand-off a second portion of the multiple requests for the content object to the second back-end server. In specific embodiments, a load is a quality of service, such as a metric that encompasses system performance, health, processing load, etc., for example. Optionally, the front-end server is configured to send a signal to additional back-end servers to cache the content object when a load of the already cached and serving back-end servers exceeds a threshold load and to hand-off portions of the multiple requests for the content object to the additional back-end servers, as necessary so as not to overload any of the back-end servers. In some embodiments, the additional back-end servers stop handling handed-off requests for the content object as the popularity of the content object reduces or as the load of the back-end servers reduces. Optionally, the additional back-end servers de-cache the content object as the demand for the content object is reduced.

In some embodiments, for example, the front-end server is further configured to query an object digest of content objects cached on each of the plurality of back-end servers and receive a result from the query that identifies the one or more back-end servers to hand-off the multiple requests for the content object to. Useful object digests include those that have entries indicating a hit count for content objects cached on each of the plurality of back-end servers and entries indicating service times for content objects cached on each of the plurality of back-end servers.

Optionally, the front-end server is further configured to exchange keepalive signals with each of the plurality of back-end servers for maintaining open connections between the front-end server and each of the plurality of back-end servers, where the keepalive signals include updates to the object digest, and update the object digest with the updates included with the keepalive signal.

In another embodiment, a method for delivering content objects over the Internet from a content delivery network to end-user systems comprises receiving multiple requests for a content object, where the front-end server connects to each of a plurality of back-end servers through a switch, determining one or more back-end servers to hand-off the multiple requests for the content object to and handing-off the requests for the content objects to the determined one or more back-end servers. Optionally, the content object is cached on a first back-end server and a first portion of the multiple requests for the content object are handed-off to a first back-end server. In an exemplary embodiment, the one or more determined back-end servers serve the content object to the end-user systems using a route that does not pass through the switch.

Optionally, all of the multiple requests for the content object are handed-off to a first back-end server, at least initially. As the demand for the content object increases, additional back-end servers may cache the content object and portions of the multiple requests can be handed-off to the additional back end servers, such as when a load of the first back-end server increases beyond a threshold load or as service times for the content object increases beyond a threshold service time. In further embodiments, as the demand for the content object decreases, as a load of the back-end servers decrease or as a service time for the content object decreases, the content object is optionally removed from the additional back-end servers and the additional back-end servers optionally stop receiving handed-off requests for the content object and serving the content object to the end-user systems.

Optionally, for certain method embodiments, determining the one or more back-end servers to hand-off the multiple requests for the content object comprises querying an object digest that tracks content objects cached on each of the plurality of back-end servers and receiving a result from the query that identifies the one or more back-end servers to hand-off the multiple requests for the content object to. Optionally, the object digest includes entries indicating a hit count for content objects cached on each of the plurality of back-end servers. Optionally, the object digest includes entries indicating service times for content objects cached on each of the plurality of back-end servers.

In exemplary embodiments, keepalive signals are exchanged between the front-end server and each of the plurality of back-end servers for maintaining open connections between the front-end server and each of the plurality of back-end servers where the keepalive signals include updates to the object digest. In one embodiment, the object digest is updated with the updates included with the keepalive signal.

Optionally, for certain method embodiments, determining the one or more back-end servers to hand-off the multiple requests for the content object to comprises querying the object digest, receiving a result from the query that identifies a service time for the content object on the first back-end server, comparing the service time for the content object on the first back-end server to a first response time threshold, caching the content object on a second back-end server when the service time for the content object on the first back-end server exceeds the first response time threshold, wherein the second back-end server is one of the plurality of back-end servers and identifying the first back-end server and the second back-end server for handing-off the multiple requests for the content object to. Optionally, for certain method embodiments, determining the one or more back-end servers to hand-off the multiple requests for the content object to comprises querying the object digest, receiving a result from the query that identifies service times for the content object on the first back-end server and/or the second back-end server, comparing the service times for the content object on the first back-end server and/or the second back-end server to a second response time threshold; and removing the content object from the first back-end server or the second back-end server when the service times for the content object on the first back-end server and/or the second back-end server fall below the second response time threshold.

In embodiments, the requests received at the front-end server are to deliver the content object to end-user systems. Optionally, the requests are from end-user system. In embodiments, the front-end server and the plurality of back-end servers are part of a content delivery network having a plurality of points of presence (POPs) and the content delivery network delivers content over the Internet to end-user systems. In an exemplary embodiment, the front-end server is an edge server and each of the plurality of back-end servers are storage servers.

In various embodiments, aspects of the present invention are embodied as an application that is executed by a processor on a server, network device or other computing device, such as a computer-program product tangibly embodied on a non-transitory machine-readable storage medium comprising instructions for execution by one or more processors in a computing device. For example, in embodiments, the above-described methods are implemented in the application layer, such as described in the OSI Model. In some embodiments, the described methods utilize application information, also referred to herein as application-level information, to determine a route or transport characteristics to be used with content objects. Similarly, in some embodiments, the above-described methods are implemented as a layer existing on top of the application layer, such as an application or software subroutine that interacts with an application-layer entity that provides an interface with a transport or network layer protocol or a communication subsystem. In a specific embodiment, a method implemented in the application layer modifies one or more transport layer or network layer parameters, such as to change the transport path that various network connections traverse. For example, embodiments include requiring that a request for a content object be passed over a specific network connection, such as an open network connection between a server within a content delivery system and an origin server, rather than opening a new network connection with the origin server. Other embodiments direct transport of network data through a specific route, such as, for example, requiring that content served to an end-user system from a content server take a network path that does not route through a switch providing a network connection between a content server and an edge server.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIG. 16 depicts a block diagram of an embodiment of a special-purpose computer system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Where the reference label is used in the specification, the description is applicable to any one of the similar components having the same reference label.

DETAILED DESCRIPTION

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It is understood that various changes may be made in the function and arrangement of elements without departing from the spirit and scope as set forth in the appended claims.

Figure 1:
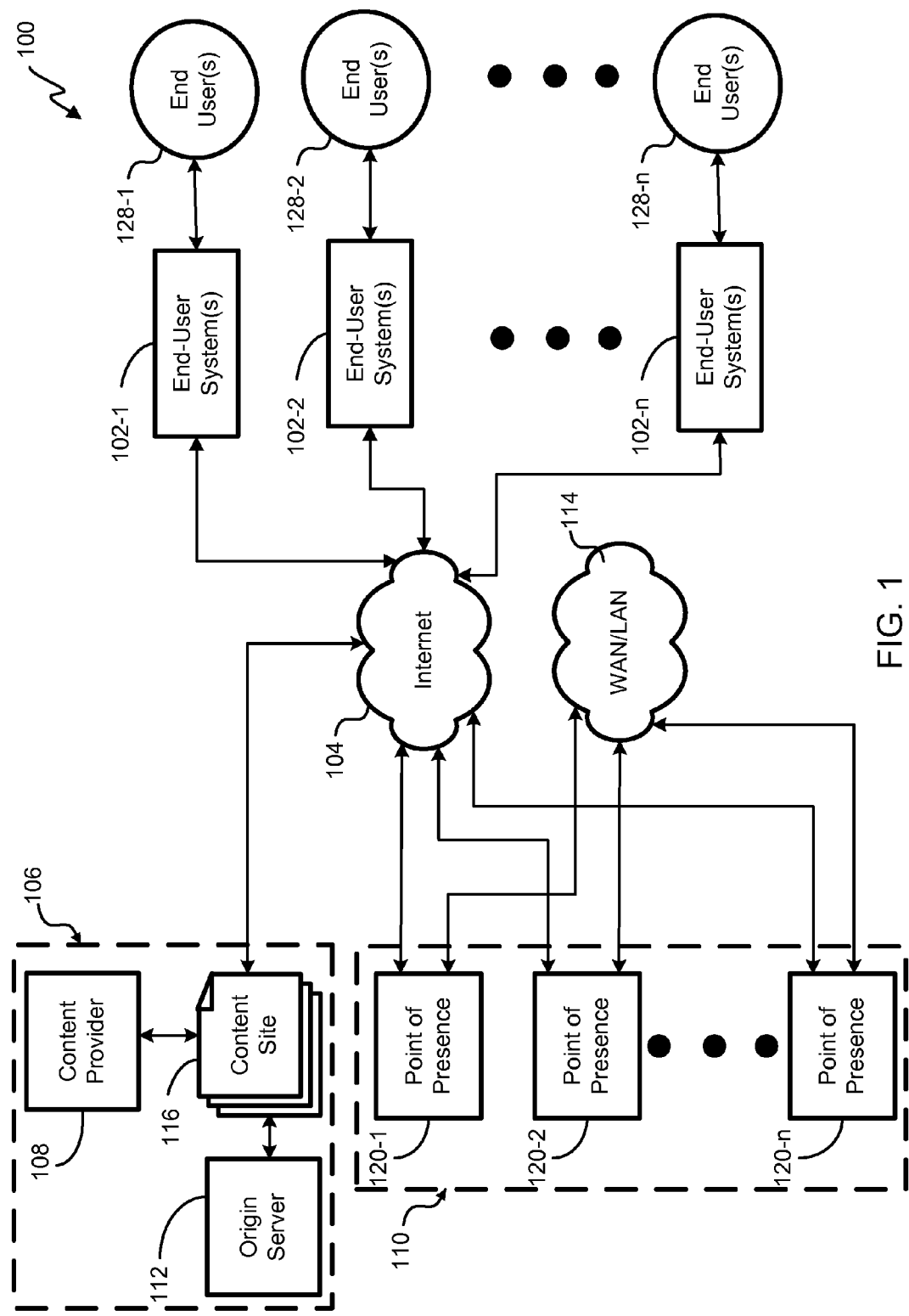
FIG. 1 depicts a block diagram of an embodiment of a content distribution system.

Referring first to FIG. 1, a block diagram of an embodiment of a content distribution system 100 is shown. The content originator 106 offloads delivery of the content objects to a content delivery network (CDN) 110. The content originator 106 produces and/or distributes content objects and includes a content provider 108, a content site 116 and an origin server 112. The CDN 110 can both cache and/or host content in various embodiments for third parties to offload delivery and typically provide better quality of service (QoS) to a broad spectrum of end-user systems 102 distributed geographically. The content originator 106 is the customer of the CDN 110 and an end user 128 benefits from improvements in QoS.

In this embodiment, the content distribution system 100 locates the content objects (or portions thereof) and distributes the content objects to an end-user system 102. The content objects are dynamically cached within the CDN 110 and/or hosted by the CDN 110. A content object is any content file, content stream or a range defining a segment of a content file or content stream, and could include, for example, video, pictures, data, audio, software and/or text. The content object could be live, delayed or stored. The range defining a segment could be defined as a byte range or time range within the playback. Throughout the specification, references may be made to a content object, content, content stream and/or content file, but it is to be understood that those terms could be used interchangeably wherever they may appear.

Many content providers 108 use a CDN 110 (or multiple CDNs) to deliver the content objects over the Internet 104 to end users 128. The CDN 110 includes a number of points of presence (POPs) 120, which are geographically distributed through the content distribution system 100 to deliver content. Various embodiments may have any number of POPs 120 within the CDN 110 that are generally distributed in various locations around the Internet 104 so as to be proximate to end-user systems 102. Multiple POPs 120 use the same IP address such that an Anycast routing scheme is used to find a POP likely to be close to the end-user system 102, in a network sense, for each request. In addition to the Internet 104, a wide area network (WAN) and/or local area network (LAN) 114 or other backbone may couple the POPs 120 with each other and also couple the POPs 120 with other parts of the CDN 110. Distributed storage, processing and caching is provided by the CDN 110.

When an end user 128 requests a web page (or other content) through its respective end-user system 102, the request for the web page is passed either directly or indirectly via the Internet 104 to the content originator 106. The content originator 106 is the source or re-distributor of content objects, i.e., the so-called origin server 112. The content site 116 is an Internet web site accessible by the end-user system 102. In one embodiment, the content site 116 could be a web site where the content is viewable with a web browser. In other embodiments, the content site 116 could be accessible with application software other than a web browser. The content provider 108 directs content requests to a CDN 110 after they are made or formulates the delivery path by embedding the delivery path into a uniform resource identifier (URI) for a web page. In any event, the request for content is handed over to the CDN 110 in this embodiment by using an Anycast IP address corresponding to two or more POPs 120. In some embodiments, the CDN 110 hosts content objects and/or web pages, thus acting as the origin server 112.

Once the request for a content object is passed to the CDN 110, the request is associated with a particular POP 120 within the CDN 110 using the Anycast routing scheme, but other embodiments could use routing, redirection or DNS to shunt requests to a particular POP 120. It is noted that the CDN 110 processes requests for content in the application layer of the open systems interconnection (OSI) model with URIs, URLs and HTTP. The particular POP 120 may retrieve the portion of the content object from the content provider 108, where the content originator 106 is hosting the origin server 112. Alternatively, the content provider 108 may directly provide the content object to the CDN 110 and POPs 120 associated with the CDN 110 through pre-population of caches (i.e., in advance of the first request) or hosting. A storage policy could be defined to specify the conditions under which pre-population is performed. In this embodiment, content objects are provided to the CDN 110 and stored in one or more CDN servers such that the portion of the requested content may be hosted from the CDN 110. The CDN servers include edge servers in each POP 120 that serve end-user requests. The origin server 112 holds a copy of each content object for the content originator 106. Periodically, the content of the origin server 112 may be reconciled with the CDN 110 through a caching, hosting and/or pre-population algorithm, for example, through a storage policy. Some content providers 108 could use an origin server 112 within the CDN 110 to host the content and avoid the need to maintain a copy.

Once the content object is retrieved, the content object is stored within the particular POP 120 and is served from that POP to the end-user system 102. The end-user system 102 receives the content object and processes the content object for use by the end user 128. The end-user system 102 could be a personal computer, media player, handheld computer, tablet, pad, Internet appliance, phone, smart phone, IPTV set top, streaming radio or any other device that receives and plays content objects. In some embodiments, a number of the end-user systems 102 could be networked together. Although this embodiment shows only a single content originator 106 and a single CDN 110, it is to be understood that there could be many of each in various embodiments.

Figure 2:
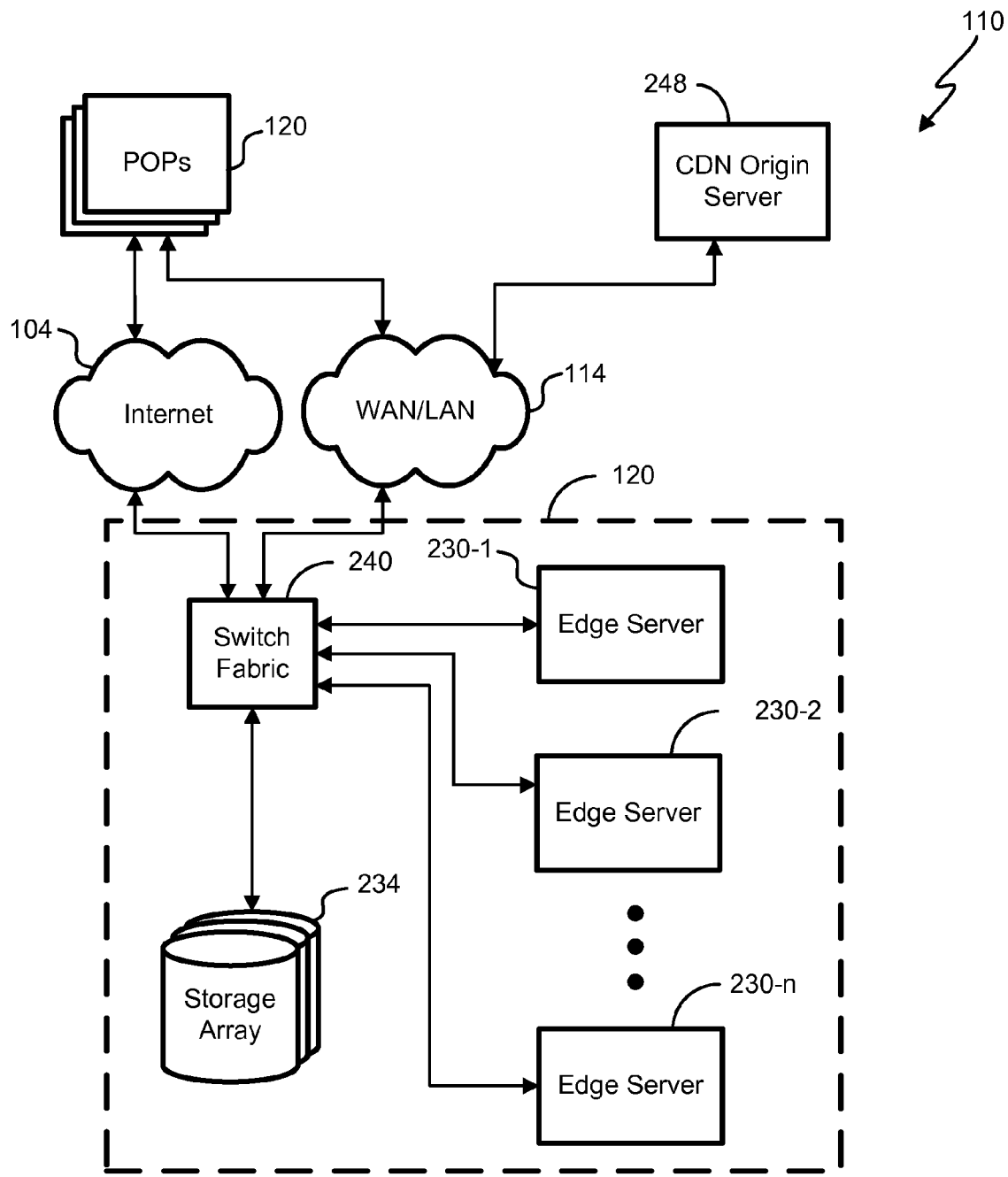
FIG. 2 depicts a block diagram of an embodiment of a content delivery network (CDN)

With reference to FIG. 2, a block diagram of an embodiment of a CDN 110 is shown. Although only one POP 120 is shown in detail, there are a number of POPs 120 similarly configured throughout the CDN 110. The POPs 120 communicate through a WAN/LAN 114 and/or the Internet 104 when locating content objects. An interface from the Internet 104 to the POP 120 accepts requests for content objects from end-user systems 102. The requests come from an Internet protocol (IP) address of the end-user system 102 in the form of a URI that causes an HTTP get command. The requests for content files from the CDN 110 pass through the application layer.

Switch fabric 240 assigns the request to one of the edge servers 230 according to a routing scheme such as round robin, load balancing, etc. In some embodiments, the switch fabric 240 is aware of which edge servers 230 have what capabilities and assigns requests within the group having the capability to store and serve the particular content object referenced in the URI. Edge servers 230, gathered in a particular group as neighbors, can be grouped with other servers in the current POP 120, less loaded servers in the current POP 120, servers having a capability to process the content object, a subset of servers assigned to a customer using the CDN 110 to serve the content object or some other grouping of servers in the POP 120.

In some cases, the CDN 110 is used to host content for others. Content providers 108 upload content to a CDN origin server 248. Although only one CDN origin server 248 is shown, it is to be understood that there could be many spread among a number of locations and/or POPs 120. The content object can be stored in the CDN origin server 248. The CDN origin server 248 serves the content object within the CDN 110 to various edge servers 230 in various POPs 120. After the content provider 108 places a content object on the CDN origin server 248 the content object need not be hosted on an origin server 112 of the content originator 106 redundantly. Although shown separately, it is to be understood that the CDN origin sever 248 could be integral to an edge server 230.

Some embodiments include an optional storage array 234 in the POP 120 or elsewhere in the CDN 110. The storage array 234 can provide hosting, storage and/or caching. Edge servers 230 can revert to the storage array 234 for certain content, for example, very large files or infrequently requested files. Flushing of a cache of an edge server 230 could move the content to the storage array 234 until it is ultimately flushed from the storage array 234 after which subsequent requests would be fulfilled by an origin server 112 to repopulate cache in the POP 120.

Requests from end-user systems are assigned to an edge server 230 that may cache, store or host the requested content object. At times, the edge server 230 receiving a request does not have the content object stored for immediate serving. This so-called "cache miss" triggers a process within the CDN 110 to find the content object (or portion thereof). The content may be found in neighboring edge servers 230 in the same POP 120, in another POP 120, in a CDN origin server 248, in a POP storage array 234 or even an origin server 112 external to the CDN 110. The various edge servers 230 and CDN origin servers 248 are grouped for various URIs uniquely. In other words, one URI may look to one group of servers 230, 248 on a cache miss while another URI will look to a different group of servers 230, 248.

Figure 3:
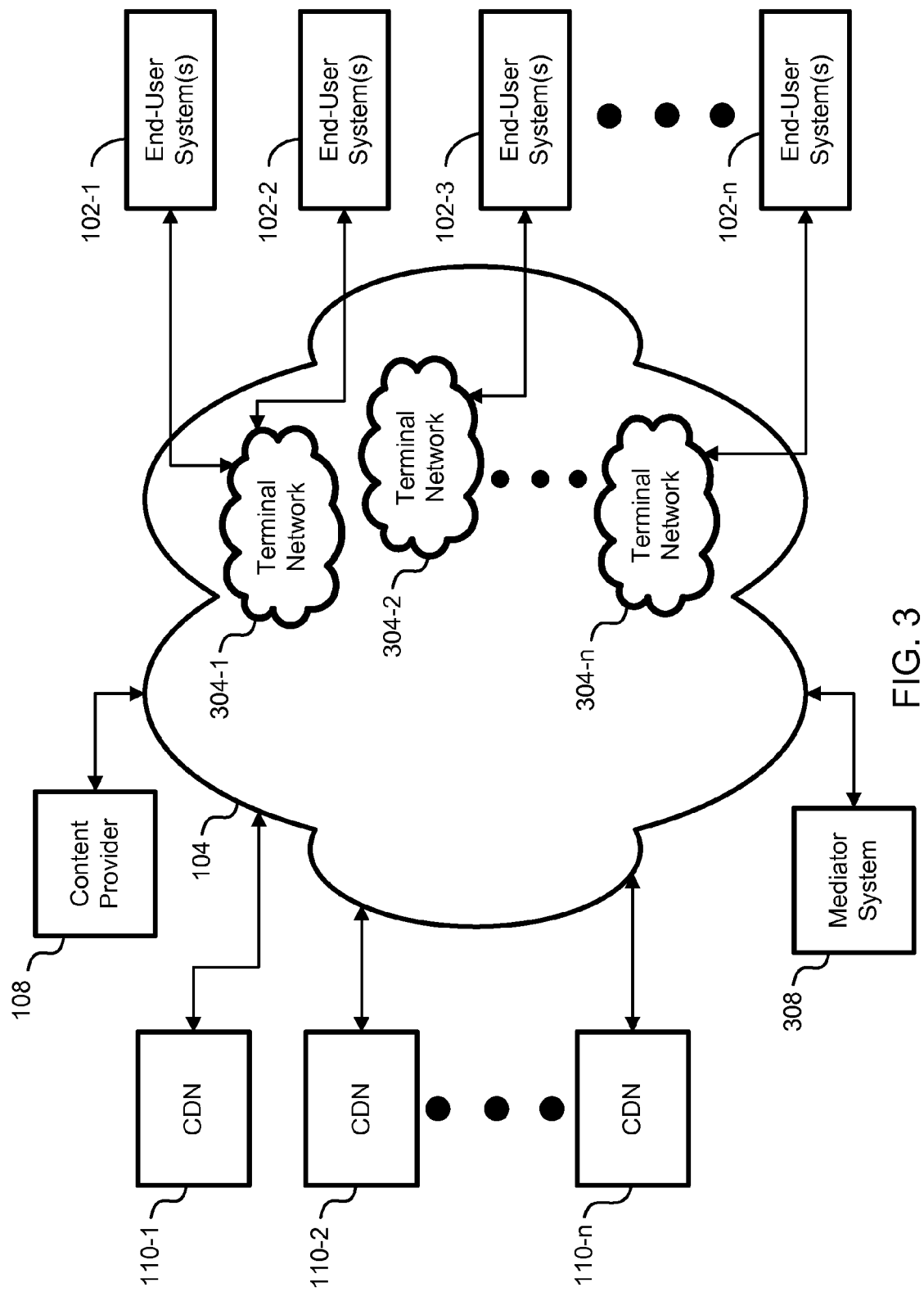
FIG. 3 depicts a block diagram of an embodiment of a cooperative delivery system.

Referring next to FIG. 3, an embodiment of a cooperative delivery system is shown. A content provider 108 is connected to the Internet 104. Also connected to the Internet 104 are a plurality of CDNs 110 and a plurality of end-user systems 102. As part of the Internet 104, a plurality of terminal networks 304 provide internet service to the plurality of end-user systems 102. In some embodiments, terminal networks 304 are "last mile" networks providing telecommunications, cable television and/or Internet services to end users 128. Some examples of terminal networks 304 include CenturyLink, Comcast, Verizon and AT&T. In some embodiments, terminal networks 304 include peer networks. In some embodiments, terminal networks 304 have caches to store content objects. Caches of the terminal networks 304 can be a single cache or spread out among a plurality of caches similar to a CDN 110 with a plurality of POPs 120. Some terminal networks 304 function as a content delivery network 110.

In this embodiment, the content provider 108 contracts with a first CDN 110-1 for delivery of a content object to end-user systems 102. Though only one content provider 108 is shown, there may be many content providers 108 contracting with CDNs 110 and/or terminal networks 304 for delivery of a plurality of content objects. Also, an origin server having the content object can be external to the CDN 110 or internal to the CDN 110, such as in a CDN origin server 248. In some embodiments, the first CDN 110-1 subcontracts delivery of the content object to a second CDN 110-2 and/or terminal network 304 for delivery to an end-user system 102. The first CDN 110-1 may subcontract delivery of the content object for various reasons. For example, the second CDN 110-2 may have a better coverage of POPs 120 in a given geographic area. The first CDN 110-1 may have several POPs 120 in North America and Europe, but not South America. The second CDN 110-2 may have several POPs 120 in South America. To deliver the content object to an end user 128 in South America, the first CDN 110-1 subcontracts delivery of the content object to the second CDN 110-2. In another example, the second CDN 110-2 also has POPs 120 in Europe. When POPs 120 of the first CDN 110-1 in Europe become overloaded, the first CDN 110-1 has the second CDN 110-2 deliver the content object in Europe.

In some embodiments, the first CDN 110-1 subcontracts delivery of the content object with terminal networks 304. For example, the first terminal network 304-1 caches the content object when delivering the content object to a first end-user system 102-1. When a second end-user system 102-2 requests the content object, the first terminal network 304-1 serves the content object from a cache of the first terminal network 304-1.

In some embodiments, a mediator system 308 is also connected to the Internet 104. The mediator system 308 serves several functions for the cooperative delivery system, such as assignment, accounting and control. In some embodiments, the mediator system 308 receives requests for delivery of the content object and assigns a CDN 110 or a terminal network 304 to deliver the content object. The mediator system 308 chooses a CDN 110 or terminal network 304 based on geography, latency in a network, delivery cost, quality of service, etc. In some embodiments, the mediator system 308 contracts with the content provider 108 for delivery of the content object instead of the first CDN 110-1 contracting with the content provider 108 for delivery of the content object. In some embodiments, the mediator system 308 is part of, and/or controlled by, a CDN 110 or terminal network 304. Also, a cooperative delivery system may comprise two or more mediator systems 308, and each of mediator systems 308 is tied to a particular CDN 110.

In some embodiments, the mediator system 308 accounts for content delivery. After assigning delivery of the content object to a CDN 110 or terminal network 304, the mediator system 308 credits that network with delivery of the content object. In other embodiments, the mediator system 308 receives reports about delivery of the content object before crediting the CDN 110 or terminal network 304 for delivery.

In some embodiments, the mediator system 308 also establishes control parameters for delivery of the content object. For example, the content provider 108 sets a minimum quality of service threshold for delivering the content object. When assigning delivery of the content object, the mediator system 308 passes variables specifying the control parameters to the CDN 110 and/or terminal network 304 delivering the content object.

As described above, it is desirable to minimize the time necessary for delivery of a content object to an end-user system requesting the content object. If the content object is not cached by a CDN that is tasked with delivery of content objects to the end-user system, the CDN may need to obtain a copy of the content objects from an origin server. Establishing a new connection between a server within the CDN and an origin server takes time and reduces the QoS for serving the requested content objects, thus it may be preferable to use an existing open connection for retrieving the needed content objects. In an exemplary embodiment, a connection digest is established that includes information about the existence of open connections between various origin servers and servers in a POP or CDN and, optionally, quality information about the open connections. Table I provides an example connection digest.

TABLE I

Sample Connection Digest Information

| Edge Server | Open Connections | Window Size (data segments/ transaction) | Saturation | Connection Quality |
|---|---|---|---|---|
| 10.7.106.1 | 192.168.5.3 | 5 | 100% | A |
|  | 255.255.6.1 | 25 | 85% | A |
|  | 75.5.103.3 | 20 | 100% | B |
|  | 23.5.88.2 | 30 | 70% | A |
| 10.7.107.1 | 38.104.272.56 | 10 | 90% | C |
|  | 77.171.248.172 | 10 | 62% | B |
| 10.7.108.1 | 201.122.250.107 | 50 | 90% | A |
| 10.7.109.1 | 75.5.103.3 | 75 | 40% | A |

Figure 4A:
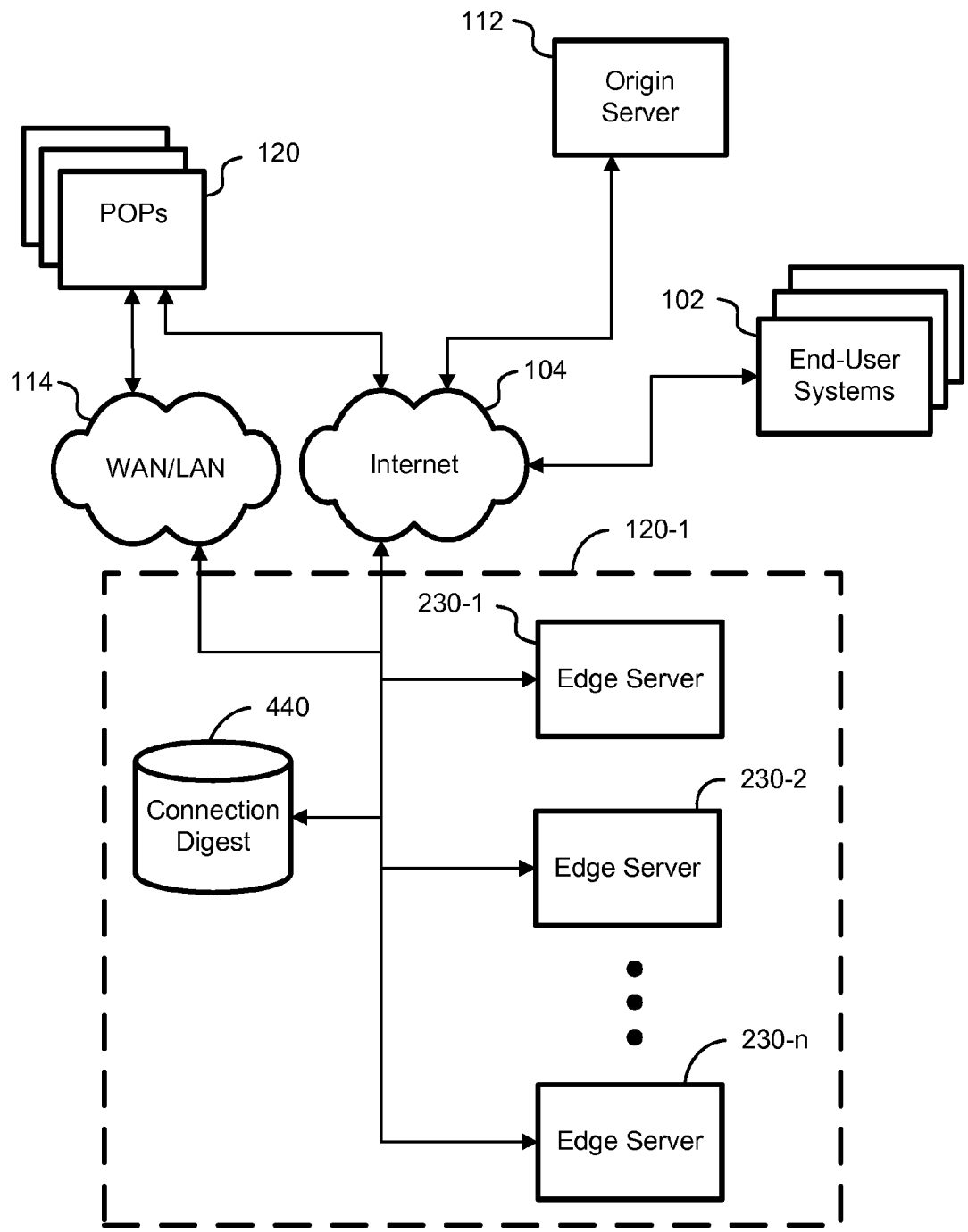
FIG. 4A, FIG. 4B and FIG. 4C depict block diagrams of content distribution system embodiments.

Referring next to FIG. 4A, an embodiment of a content distribution system is shown. Here, POPs 120 communicate through a WAN/LAN 114 and/or the Internet 104 when locating content objects and deliver content objects to end-user systems 102 via the Internet 104. In the embodiment shown, POPs 120 communicate with origin server 112 over the Internet 104, but embodiments are contemplated where POPs 120 communicate with the origin server via WAN/LAN 114. POP 120-1 is depicted in detail, and includes edge servers 230. When a request for a content object is received at edge server 230-1 from an end-user system 102, the edge server 230-1 will serve the content object to the end-user system 102 if the content object is cached by edge server 230-1. Optionally, edge server may direct end-user system 102 to edge server 230-2 or may hand-off the request to edge server 230-2 if the content object is cached by edge server 230-2. In some circumstances, however, another of POPs 120 may cache the requested content object, and edge server 230-1 may direct the end user system 102 to or hand-off the request to a server within another of POPs 120 that has the content object cached.

In the event that the content object is not cached by any edge servers in POP 120-1, it may need to be retrieved from the origin server 112. To determine if there is an existing open connection with the origin server 112, the edge server 230-1 handling the user request queries a connection digest 440 of existing open connections from servers within POP 120-1 to other servers. The existing open connection with origin server 112 is used to retrieve the content object for caching within pop 120-1 and serving to the end user system 102.

Figure 4B:
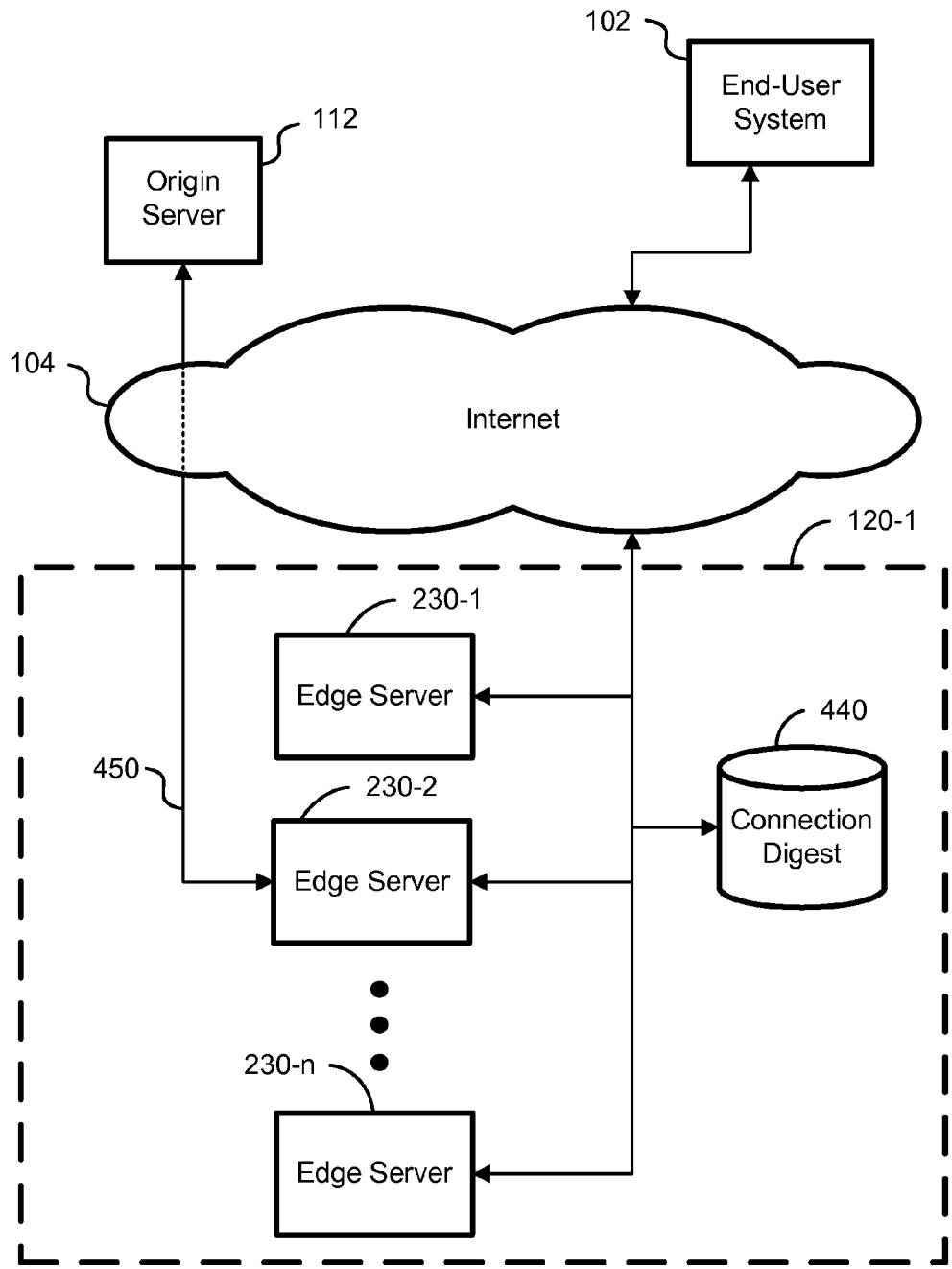

FIG. 4B depicts a further embodiment of one POP of a content distribution system to illustrate that edge server 230-2 has an open connection 450 with the origin server 112 via the Internet 104. Various procedures may be employed for serving the requested content object to the end user system 102. In one embodiment, edge server 230-2 may cache the content object locally, by obtaining a copy via open connection 450, and then serve the content object to the end-user system 102. In another embodiment, edge server 230-2 caches the content object on edge server 230-1 by obtaining a copy via open connection 450 and storing the obtained copy on edge server 230-1, such that edge server 230-1 could fulfill the request for the content object to end-user system 102. In a further embodiment, the request for the content object is optionally transferred to the origin server 112, which then serves the content object to end-user system 102, though this may entail establishing a new connection between the origin server 112 and end-user system 102.

Figure 4C:
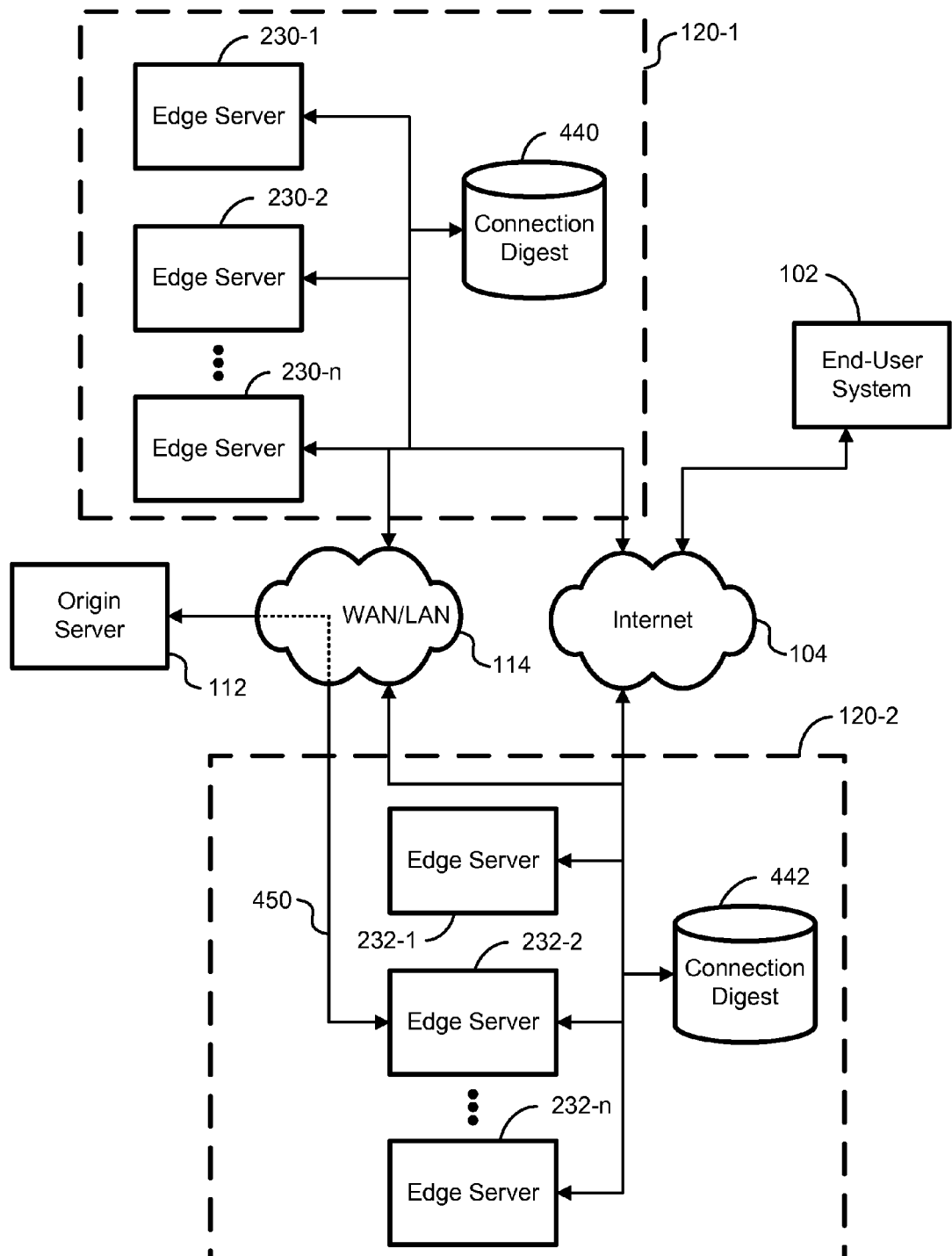

For some embodiments all the servers in one POP in a CDN may not include an open connection with an origin server while another server in another POP in the CDN or a server in a federated CDN may have an open connection with the origin server with which to obtain the needed content object. FIG. 4C illustrates a content delivery system embodiment in which none of edge servers 230 in POP 120-1 have an open connection with origin server 112. In order for edge server 230-1 to quickly fulfill the request from end-user system for the desired content object, edge server 230-1 queries the connection digest 440 to determine that edge server 232-2 in POP 120-2 has an open connection with the origin server 112. In the embodiment shown in FIG. 4C, edge server 232-2 has an open connection 450 with the origin server 112 over the WAN/LAN 114. The open connection 450 is used to obtain the content object from origin server 112, which is cached in POP 120-2 or POP 120-1 and served to end-user system 102 over the Internet 104.

Figure 5:
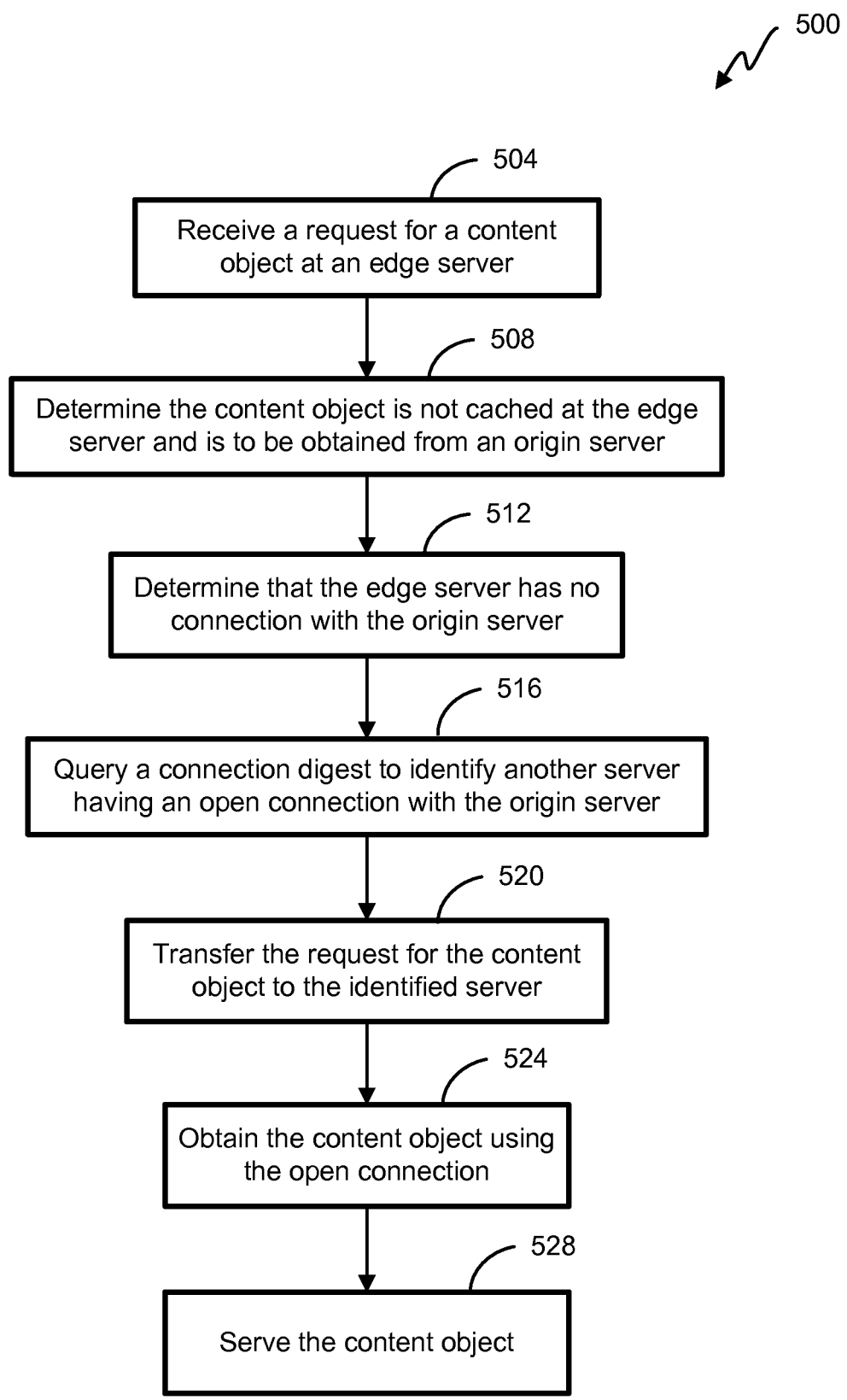
FIG. 5 illustrates a flowchart of an embodiment of a process for serving content objects.

FIG. 5 provides an overview of an exemplary method embodiment 500 for serving a content object by a content delivery network by incorporation of a connection digest. Initially, at 504, a request for the content object is received at an edge server. Such a request may come directly from an end-user system, and this request may be directed by an origin server or website. At 508, it is determined that the content object is not cached at the edge server and needs to be obtained from the origin server. It is further determined at 512 that the edge server has no connection with the origin server, or that the edge server has a poor, slow or otherwise undesirable connection with the origin server and, for example, that it would be preferable to use an existing open connection to cache the content object within the content delivery network. At 516, the connection digest is queried to identify another server that has an open connection with the origin server. The request for the content object is transferred to the server identified by the query to the connection digest at 520 and the content object is obtained using the open connection at 524. Finally, at 528, the content object, now cached by the content delivery network, is served to the end user system.

In some embodiments, connections between various origin servers and the servers within a POP are systematically maintained. These persistent connections can provide further advantages for retrieval of non-cached content objects, as it may be possible to route all requests for content objects from a specific origin server to a specific server within a POP or CDN. Such a server is referred to herein as an acceleration node, as this server, for example, allows for accelerated retrieval of content objects from the specific origin server it maintains a persistent connection with. In this way, the acceleration node allows for efficiently handling requests from many front-end or edge servers for content objects from specific origin servers. Table II provides an exemplary acceleration node look-up table.

TABLE II

Sample Acceleration Node Look-up Table

| Origin | IP Address | Acceleration Node |
|---|---|---|
| quicksilver.com | 67.70.57.43 | 10.7.107.1 |
| mtv.com | 206.113.225.81 | 32.199.0.1 |
| tivo.com/tivo-tco/top25 | 167.245.252.51 | 10.7.27.5 |
| tivo.com/tivo-tco/program/ID=tivo:cl.20947 | 167.245.176.24 | 10.7.146.220 |

Figure 6:
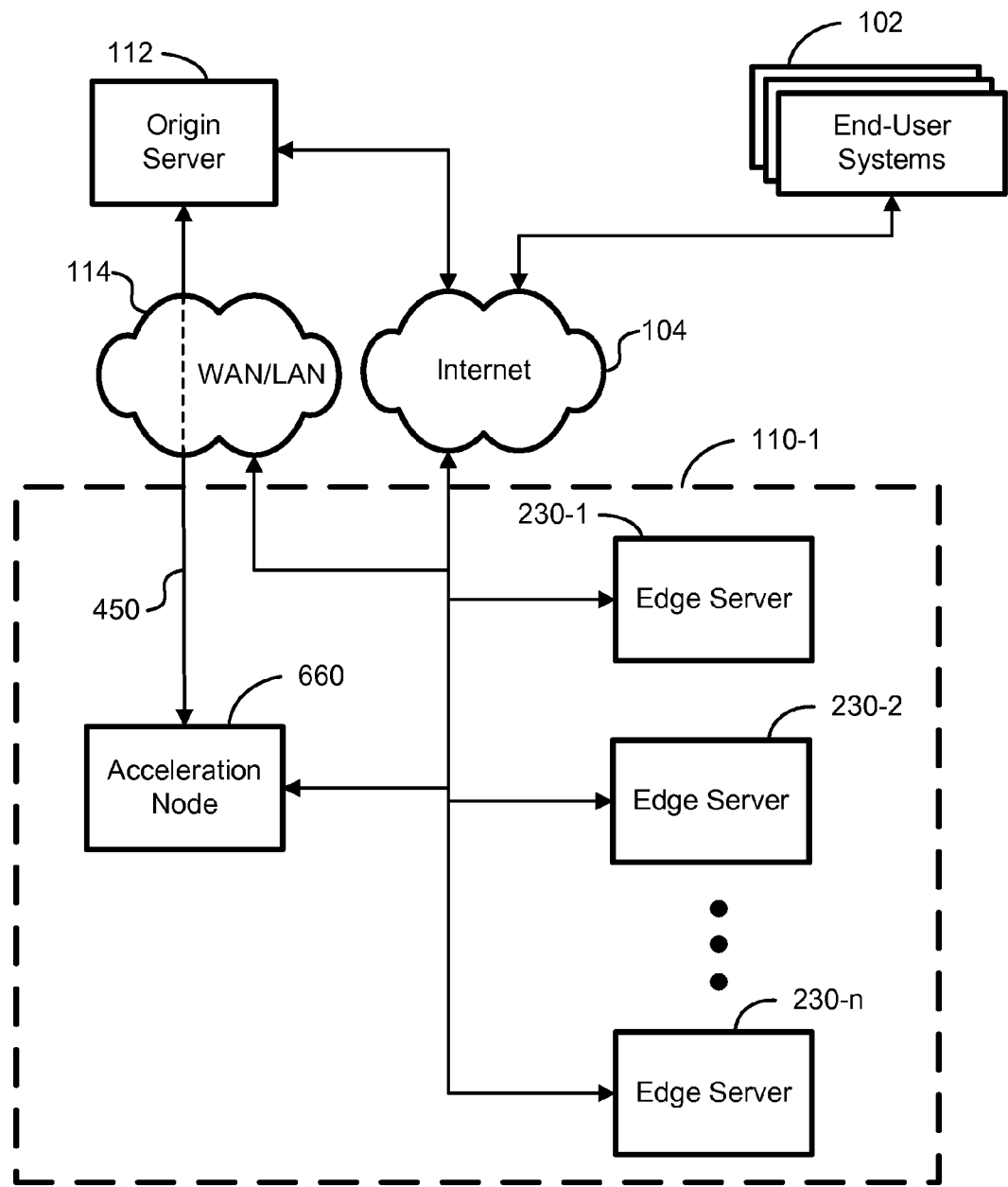
FIG. 6 depicts a block diagram of a content distribution system embodiment.

FIG. 6 illustrates another content delivery system embodiment. Here, POP 110-1 comprises edge servers 230 and acceleration node 660. In the embodiment shown, acceleration node maintains an open connection 450 with the origin server, such as a persistent open connection. Here, edge servers 230 are configured such that any content object that is not cached by POP 110-1 and needs to be retrieved from origin server 112 can be obtained using the open connection 450 with the origin server. Such a configuration is advantageous, as various individual servers in a POP can each function as an acceleration node for obtaining content objects from one or more origin servers, such that a variety of open connections can be maintained with various origin servers and all requests for content objects from a specific origin server can be directed through a persistent open connection from one of the acceleration nodes to the specific origin server, such that no new connections with the various origin servers ever need to be created. In some embodiments, an acceleration digest is maintained that provides a reference list of the persistent connections maintained by the various acceleration nodes within a content delivery system or POP and methods involving this aspect optionally include querying the acceleration digest to determine which acceleration node to transfer a request for a content object to.

Figure 7:
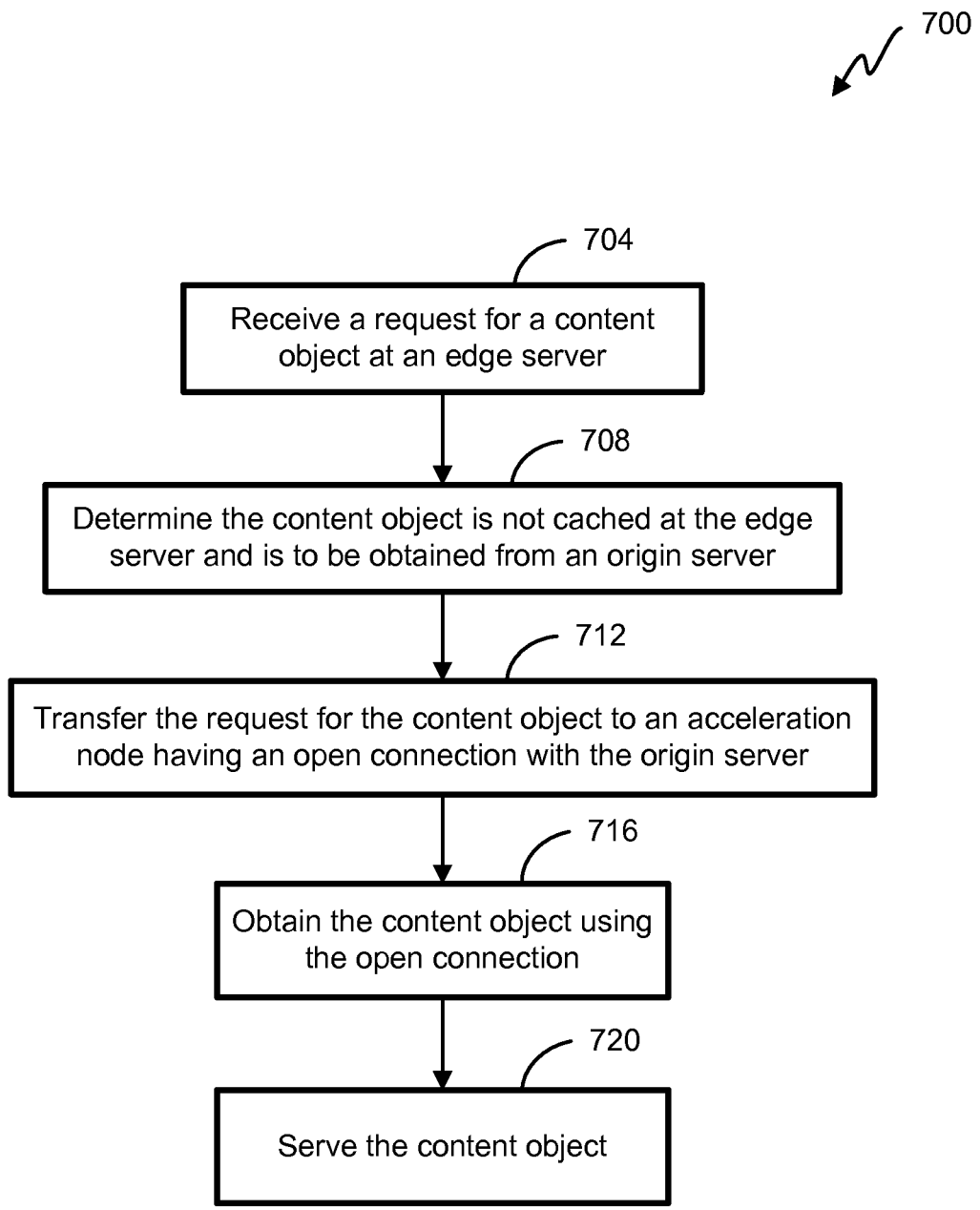
FIG. 7 illustrates a flowchart of an embodiment of a process for serving content objects.

FIG. 7 provides an overview of an exemplary method embodiment 700 for serving content objects by a content delivery system incorporating the use of an acceleration node. At 704, a request for a content object is received by an edge server. Next at 708, it is determined that the content object is not cached at the edge server and needs to be obtained from an origin server. The request is transferred to an acceleration node that maintains an open connection with the origin server at 712. At 716, the content object is obtained using the open connection of the acceleration node. The content object is then served to the requesting system at 720.

Figure 8:
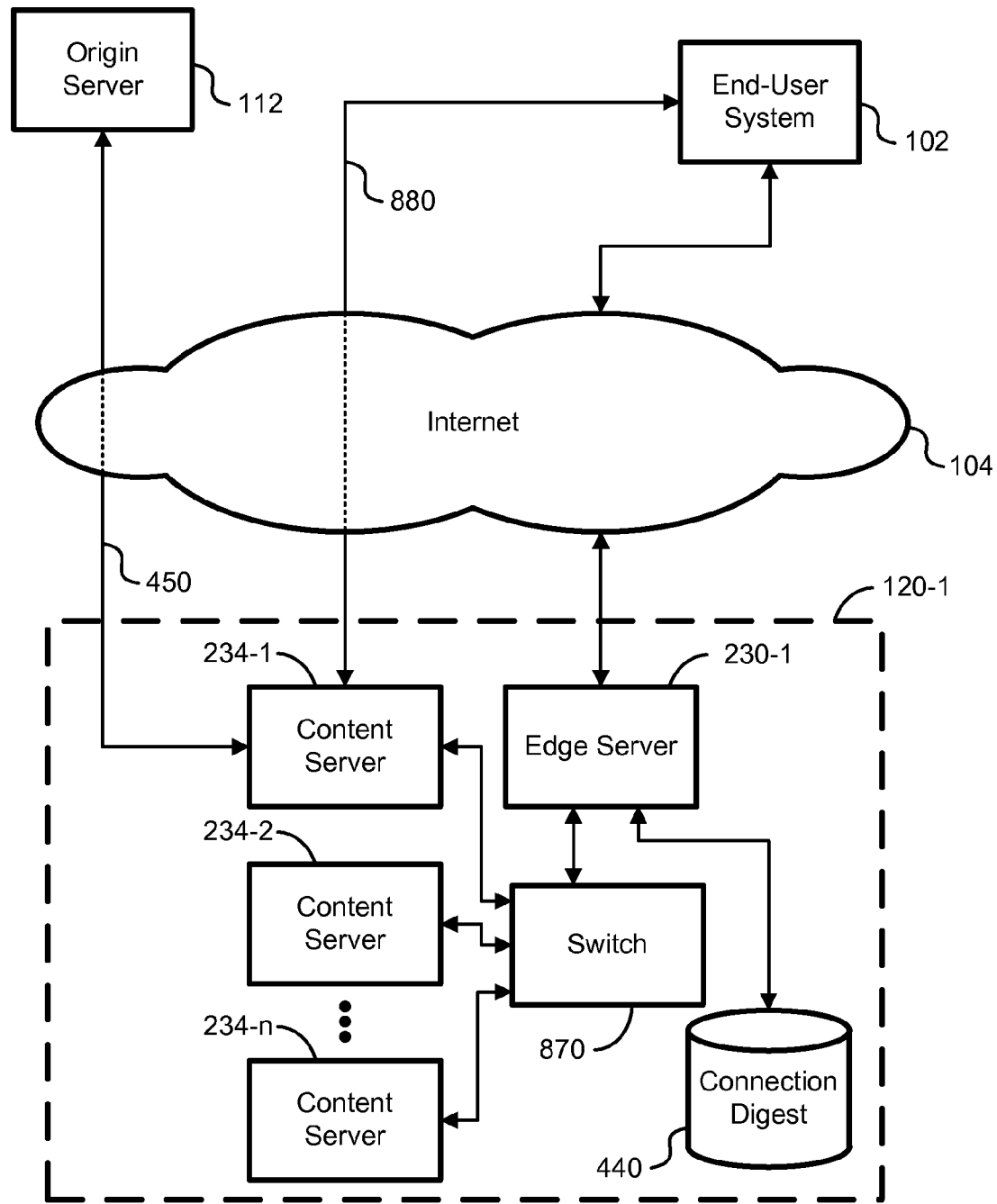
FIG. 8 depicts a block diagram of a content distribution system embodiment.

FIG. 8 depicts a content delivery system in which POP 120-1 includes a front-end server, here exemplified as edge server 230-1, and multiple back-end servers, here exemplified as content servers 234. As illustrated, content servers 234 each connect to switch 870 and edge server 230-1 also connects to switch 870. A request from end user system 102 received by edge server 230-1 for a content object may be handed-off to one of content servers 234 for delivery using a connection 880 that does not pass through switch 870. As may be necessary or desirable for a content object that is not cached by any of content servers 234, a query of connection digest 440 can provide information regarding the open connection 450 between content server 234-1 and origin server 112, and open connection 450 can be used to cache the content object for delivery to end user system over connection 880.

Handing-off requests for content objects from a front-end system to a back-end system such that the content object is not served via a route that passes through switch 870 is advantageous for minimizing the problem of congestion at switch 870 referred to as incast or TCP incast. Incast occurs when multiple back-end systems simultaneously or nearly simultaneously respond to requests from a front-end system, such that the buffer at the switch port connecting to the front-end server is overloaded and packets are lost. This circumstance is known to significantly and detrimentally reduce throughput between the switch and the front-end server, resulting in an effective many-fold loss of bandwidth between the front-end server and all of the back-end servers. The hand-off technique described above reduces the problem of TCP incast by optionally serving the requests for content objects to the end-users via a route that does not pass through the switch between the back-end servers and the front-end server.

Figure 9:
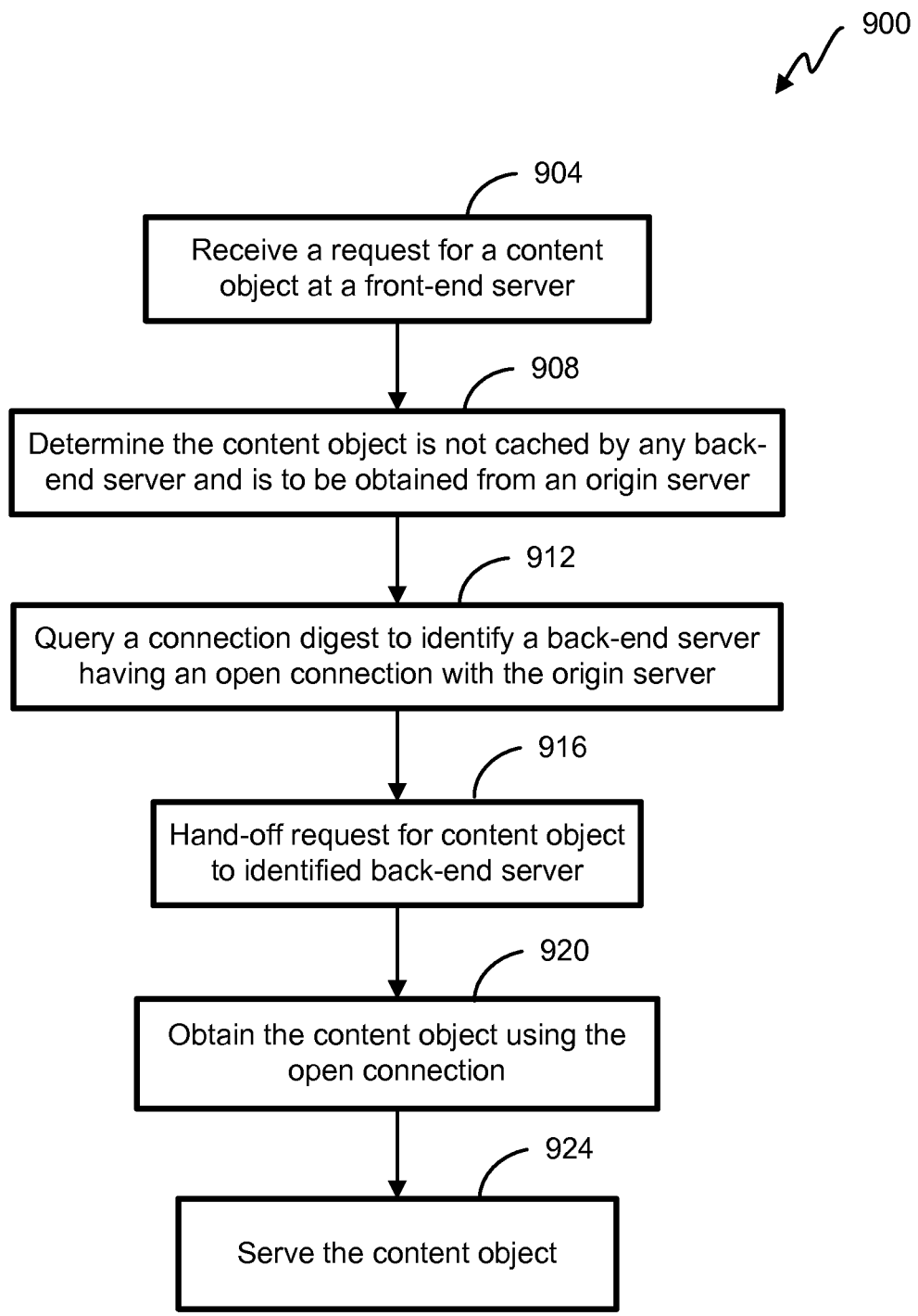
FIG. 9 illustrates a flowchart of an embodiment of a process for serving content objects.

FIG. 9 provides an overview of a method for handing-off requests for content objects from a front-end server to a back-end server, for example, providing for reducing the occurrence of incast. Initially, at 904, the front-end server receives a request for a content object. At 908, it is determined that the content object is not cached by any back-end server and needs to be obtained from an origin server. Next, at 912, a connection digest is queried to identify a back-end server that has an existing open connection with the origin server. At 916, the request for the content object is handed-off to the back-end server having an existing open connection with the origin server. The content object is obtained, at 920, using the open connection with the origin server and then the content object is served, at 924. To avoid congestion at a switch between the back-end server and the front end server, the content object served at 924 is served via a route that does not pass through the switch between the back-end server and the front-end server.

Figure 10:
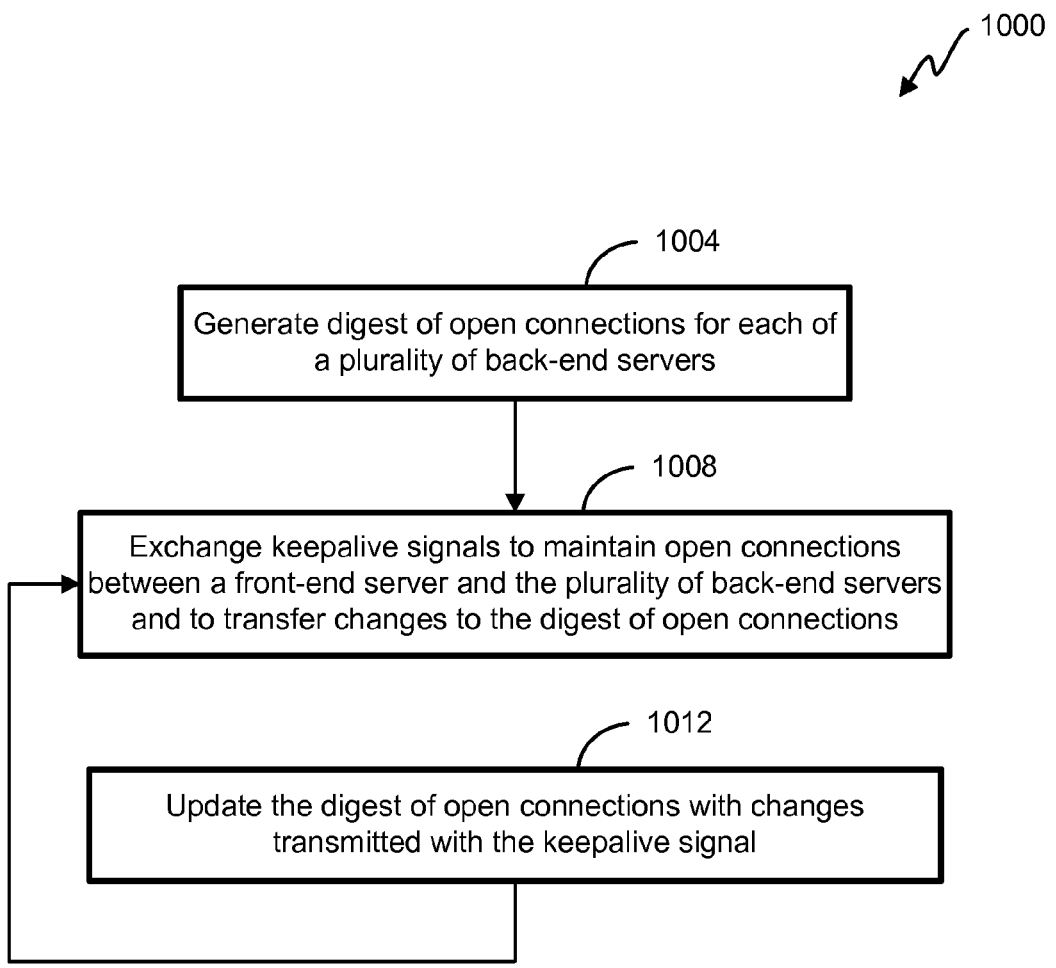
FIG. 10 illustrates a flowchart of an embodiment of a process for updating a connection digest.

FIG. 10 provides an overview of a method that provides additional advantages by using the hand-off technique described above with a connection digest. In order to ensure that open connections are maintained between various servers in a POP, such as between a front-end server and multiple back-end servers, a "heartbeat signal" or "keepalive signal" is periodically exchanged between servers. Such a keepalive signal allows servers to maintain an existing connection open between one another or to check for the existence of open connections. In various embodiments, the keepalive signals include updates to the connection digest. Such a configuration advantageously allows servers to maintain an open connection between one another but also to keep the connection digest updated with any changes to the list of open connections and/or the quality of the open connections. Initially, at 1004, the connection digest is generated, providing a list of the open connections with various origin servers for each of the back-end servers. Next, at 1008, keepalive signals are exchanged to maintain open connections between the front-end server and each of the back-end servers and to transfer the changes to the connection digest. At 1012, the connection digest is updated with the changes included with the keepalive signal.

Figure 11:
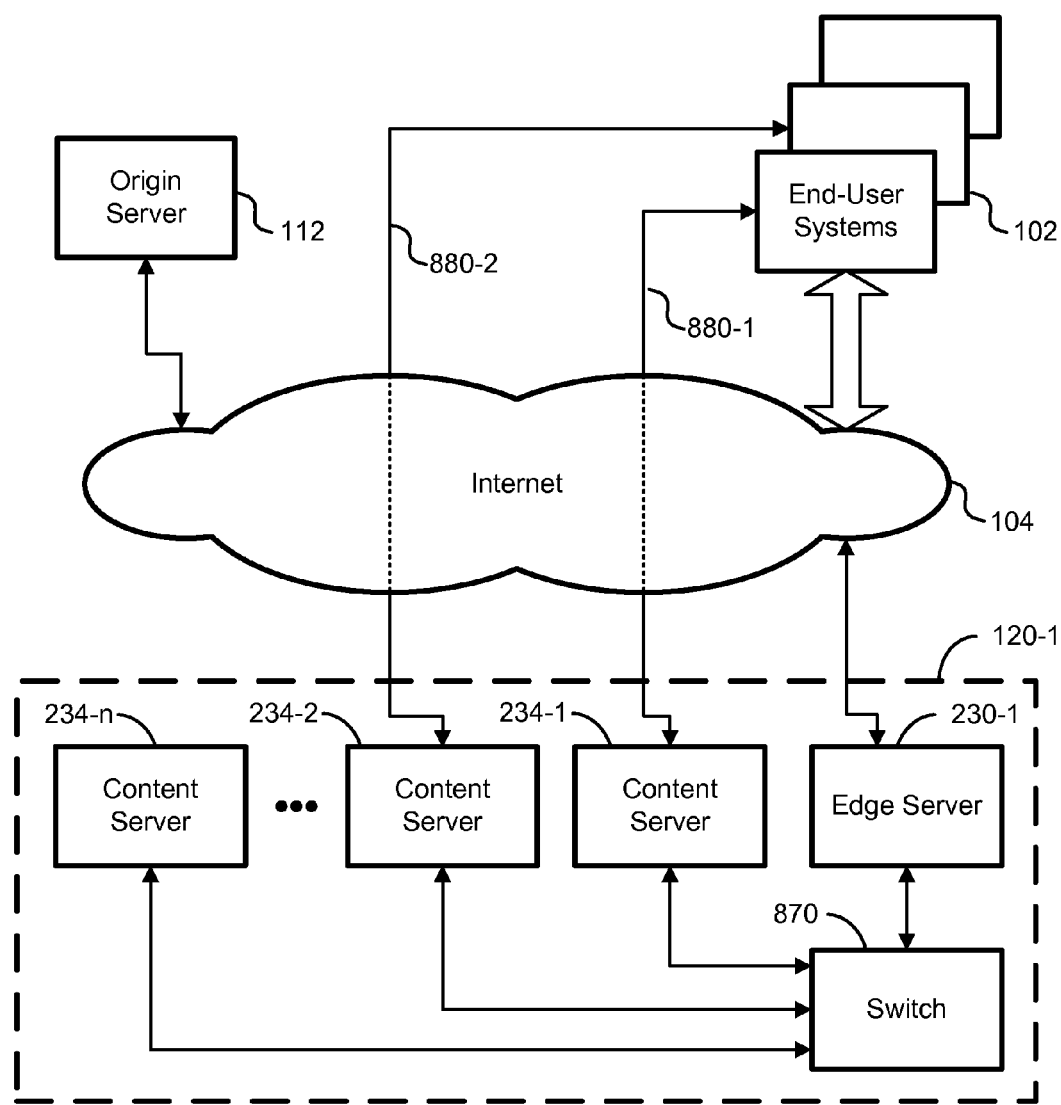
FIG. 11 depicts a block diagram of a content distribution system embodiment.

FIG. 11 depicts a content delivery system configured for handling multiple requests from end user systems 102 for a content object. Here, a front-end server, configured as an edge-server 230-1, connects to a switch 870. Multiple back-end servers, shown here as content servers 234, also connect to switch 870. To maximize the QoS for delivery of the content object, the content object is cached by content server 234-1 and the multiple requests for the content object are handed-off to the content server 234-1 for serving to the multiple end-user systems 120. Such a configuration is optionally referred to as cache array protocol (CARP). If multiple back-end servers respond simultaneously to the front-end server, this may result in the TCP incast problem described above. The content server 234-1 optionally serves the content object using a connection that does not pass through switch 870, helping to avoid the TCP incast problem. Optionally, the system includes an object digest that aides in determining which back-end server has cached which content objects. Optionally, the system includes a connection digest for identifying a server with an open connection with origin server 112, such as for obtaining a copy of a content object as described above.

As the load of the content server 234-1 increases, such as past a threshold load, the content object is cached by a second content server 234-2, and a portion of the multiple requests are handed-off to content server 234-2 for serving to end-user systems 102. Such a configuration with multiple back-end servers handling requests for a single content object is optionally referred to as mCARP. Additional content servers 234 can cache the content object and handle a portion of the requests for the content object in this fashion as the demand for the content object increases and as the loads of content servers 234 increase. As the demand for the content object decreases, the additional content servers, such as content server 234-2, can stop being handed-off the requests for the content object; optionally, the content object can be removed from the cache of content server 234-2, as necessary. In exemplary embodiments, the number of content servers 234 that cache a particular content object is dynamically updated, such as to provide a varying number of content servers 234 as the popularity of the content object changes over time.

Figure 12:
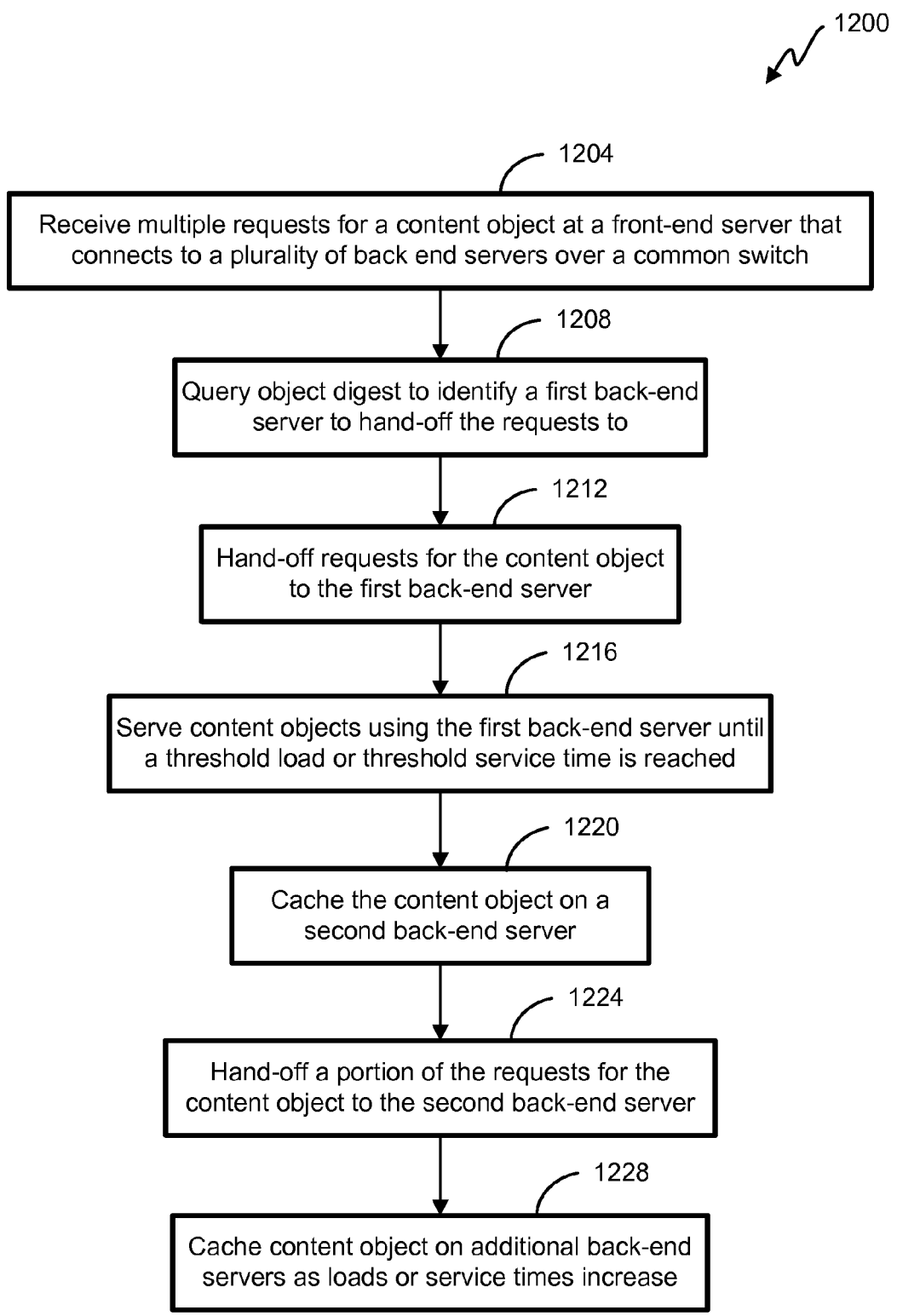
FIG. 12 illustrates a flowchart of an embodiment of a process for serving content objects.

FIG. 12 provides an overview of an exemplary method for serving content objects. At 1204, multiple requests for a content object are received at a front-end server, such as with a connection configuration where the front-end server connects to a plurality of back-end servers over a switch. At 1208, an object digest is queried to identify a first back-end server to hand-off the requests to. At 1212, the front-end server hands-off the requests for the content object to the first back-end server. The first back-end server then serves, at 1216, the content object to the end user systems requesting the content object. After a threshold load of the first back-end server is reached or after a threshold service time for serving the content object by the first back-end server is reached, the content object is cached by a second back-end server, at 1220. A portion of the requests for the content object are handed-off to the second back-end server at 1224 for serving to the end-user systems. At 1228, as the load or service times of the back-end servers increases, the content object is optionally cached on additional back-end servers with a portion of the requests for the content object handed-off to the additional back-end servers for serving to the end-user systems.

Figure 13:
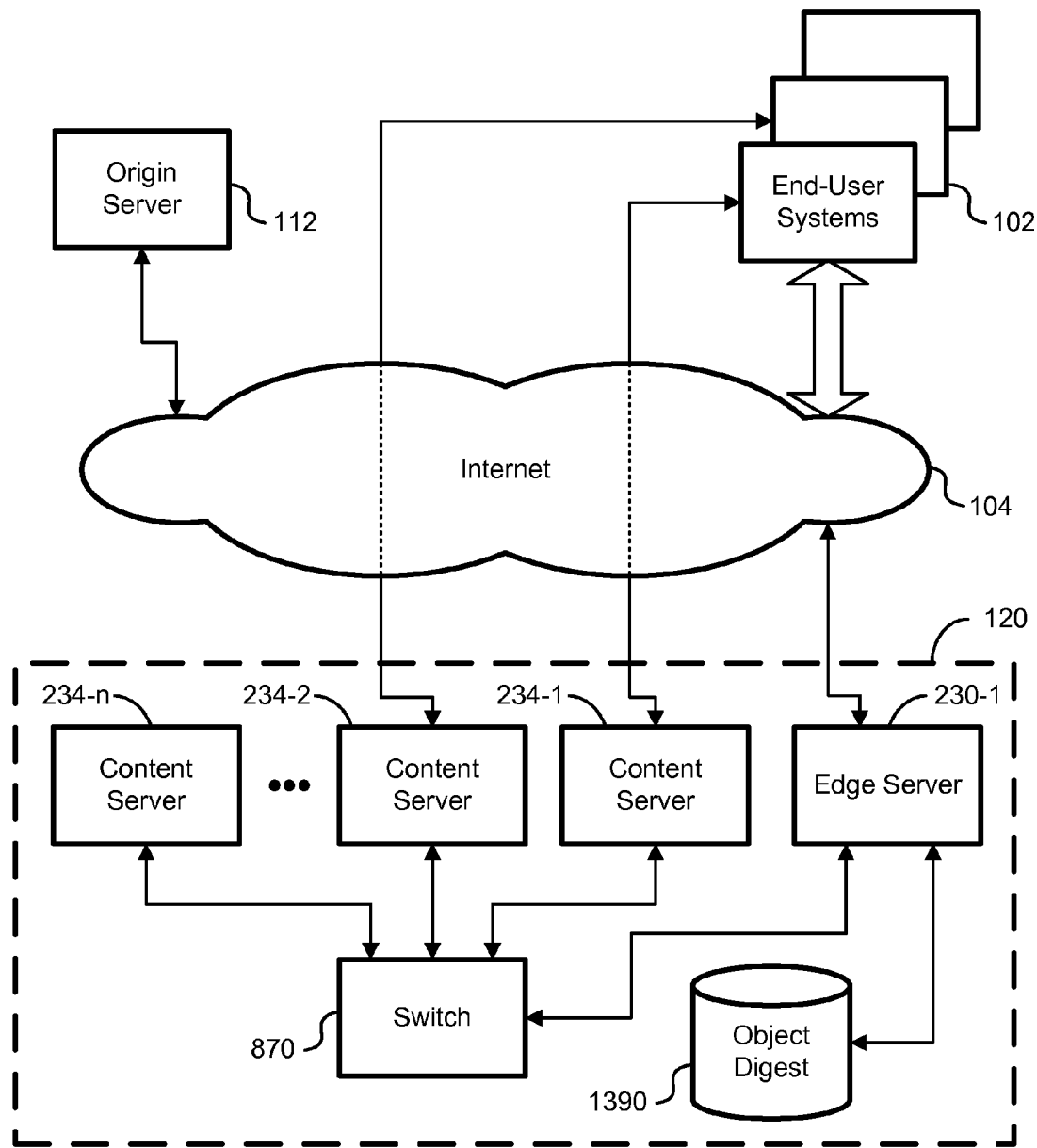
FIG. 13 depicts a block diagram of a content distribution system embodiment.

FIG. 13 depicts a content delivery system featuring an object digest 1380, such as for providing a list of the content objects cached by which content servers. As described with respect to FIG. 11, various content servers 234 are cached with various content objects as necessary to maintain a high QoS for serving to end user systems 102. The object digest 1380 is used to aid in identifying which content server 234 has cached which content objects and facilitate handing-off the requests for the content objects to the appropriate content server 234. As the system changes and various content objects are added to and removed from the cache of the content servers 234, updates to the object digest 1380 are necessary to facilitate efficient use of the object digest. In one embodiment, the content servers 234 periodically send updates to the list of content objects they have cached to the edge server 230-1 or other location updating the object digest 1380. In an exemplary embodiment, keepalive signals are exchanged periodically between each of content servers 234 and edge server 230-1 to maintain an open connection between servers and the updates to the object digest are included with the keepalive signals. In some embodiments, the keepalive signals include only changes to the list of objects cached by particular content servers. In other embodiments, the keepalive signals include the full list of objects cached by particular content servers. In this way, a complete copy of the object digest can be reconstructed or a working copy of the object digest can be updated as changes occur.

Figure 14:
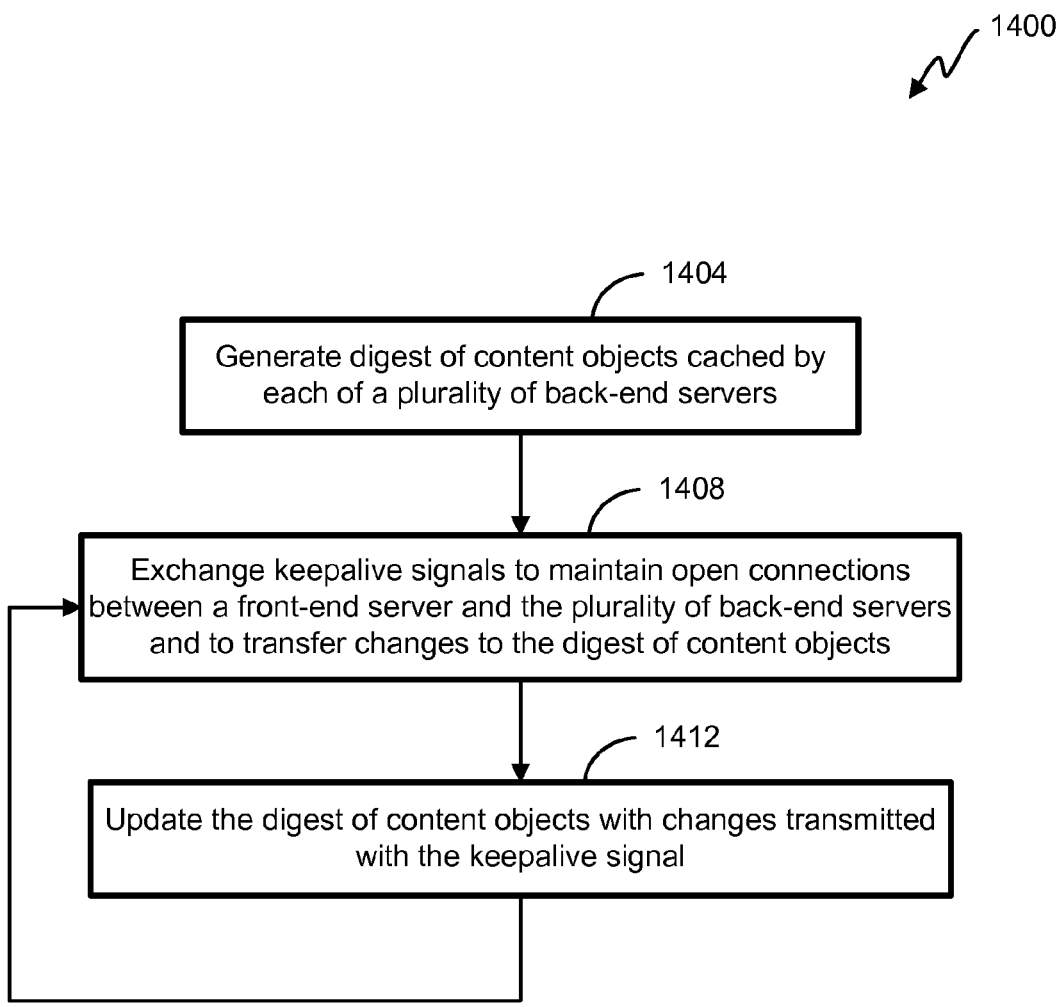
FIG. 14 illustrates a flowchart of an embodiment of a process for updating an object digest.

FIG. 14 provides an overview of one method for updating an object digest. Initially, at 1404, the object digest is generated, providing a list of the content objects cached on each of the back-end servers. Next, at 1408, keepalive signals are exchanged to maintain open connections between the front-end server and each of the back-end servers and to transfer the changes to the object digest. At 1412, the object digest is updated with the changes included with the keepalive signal.

Figure 15:
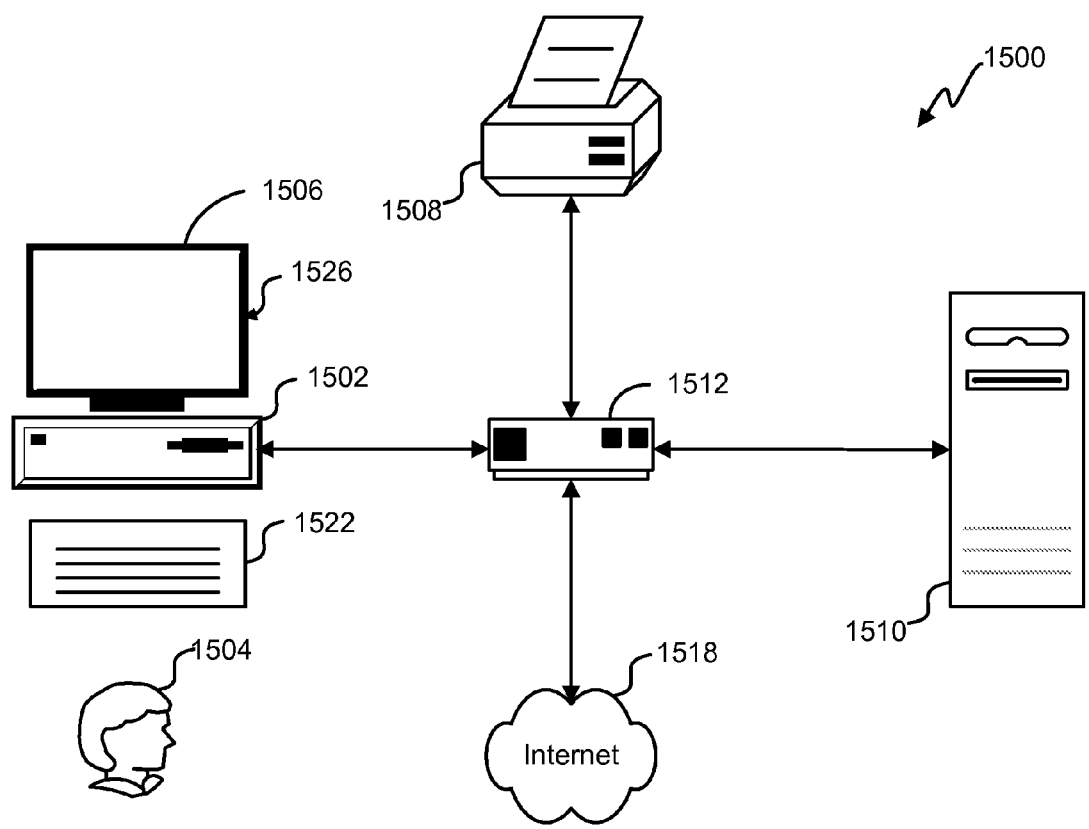
FIG. 15 depicts a block diagram of an embodiment of a computer system.

Referring next to FIG. 15, an exemplary environment with which embodiments may be implemented is shown with a system 1500 that can be used by a designer 1504 to design, for example, electronic designs. The computer system 1500 can include a computer 1502, keyboard 1522, a network router 1512, a printer 1508 and a monitor 1506. The monitor 1506, processor 1502 and keyboard 1522 are part of a computer system 1526, which can be a laptop computer, desktop computer, handheld computer, mainframe computer, etc. The monitor 1506 can be a CRT, flat screen, etc.

A designer 1504 can input commands into the computer 1502 using various input devices, such as a mouse, keyboard 1522, track ball, touch screen, etc. If the system 1500 comprises a mainframe, a designer 1504 can access the computer 1502 using, for example, a terminal or terminal interface. Additionally, the computer system 1526 may be connected to a printer 1508 and a server 1510 using a network router 1512, which may connect to the Internet 1518 or a WAN.

The server 1510 may, for example, be used to store additional software programs and data. In one embodiment, software implementing the systems and methods described herein can be stored on a storage medium in the server 1510. Thus, the software can be run from the storage medium in the server 1510. In another embodiment, software implementing the systems and methods described herein can be stored on a storage medium in the computer 1502. Thus, the software can be run from the storage medium in the computer system 1526. Therefore, in this embodiment, the software can be used whether or not computer 1502 is connected to network router 1512. Printer 1508 may be connected directly to computer 1502, in which case, the computer system 1526 can print whether or not it is connected to network router 1512.

With reference to FIG. 16, an embodiment of a special-purpose computer system 1600 is shown. The above methods may be implemented by computer-program products that direct a computer system to perform the actions of the above-described methods and components. Each such computer-program product may comprise sets of instructions (codes) embodied on a computer-readable medium, such as a non-transitory medium or non-volatile medium, that directs the processor of a computer system to perform corresponding actions. The instructions may be configured to run in sequential order or in parallel (such as under different processing threads) or in a combination thereof. After loading the computer-program products on a general purpose computer system 1526, it is transformed into the special-purpose computer system 1600.

Special-purpose computer system 1600 comprises a computer 1502, a monitor 1506 coupled to computer 1502, one or more additional user output devices 1630 (optional) coupled to computer 1502, one or more user input devices 1640 (e.g., keyboard, mouse, track ball, touch screen) coupled to computer 1502, an optional communications interface 1650 coupled to computer 1502, a computer-program product 1605 stored in a tangible computer-readable memory in computer 1502. Computer-program product 1605 directs system 1600 to perform the above-described methods. Computer 1502 may include one or more processors 1660 that communicate with a number of peripheral devices via a bus subsystem 1690. These peripheral devices may include user output device(s) 1630, user input device(s) 1640, communications interface 1650 and a storage subsystem, such as random access memory (RAM) 1670 and non-volatile storage drive 1680 (e.g., disk drive, optical drive, solid state drive), which are forms of tangible computer-readable memory.

Computer-program product 1605 may be stored in non-volatile storage drive 1680 or another computer-readable medium accessible to computer 1502 and loaded into memory 1670. Each processor 1660 may comprise a microprocessor, such as a microprocessor from Intel® or Advanced Micro Devices, Inc.® or the like. To support computer-program product 1605, the computer 1502 runs an operating system that handles the communications of product 1605 with the above-noted components, as well as the communications between the above-noted components in support of the computer-program product 1605. Exemplary operating systems include Windows® or the like from Microsoft Corporation, Solaris® from Sun Microsystems, LINUX, UNIX and the like.

User input devices 1640 include all possible types of devices and mechanisms to input information to computer system 1502. These may include a keyboard, a keypad, a mouse, a scanner, a digital drawing pad, a touch screen incorporated into the display, audio input devices such as voice recognition systems, microphones, video input devices, motion sensing input devices and other types of input devices. In various embodiments, user input devices 1640 are typically embodied as a computer mouse, a trackball, a track pad, a joystick, wireless remote, a drawing tablet, a voice command system and/or a webcam. User input devices 1640 typically allow a user to select objects, icons, text and the like that appear on the monitor 1506 via a command such as a click of a button or the like. User output devices 1630 include all possible types of devices and mechanisms to output information from computer 1502. These may include a display (e.g., monitor 1506), printers, non-visual displays such as audio output devices, etc.

Communications interface 1650 provides an interface to other communication networks and devices and may serve as an interface to receive data from and transmit data to other systems, WANs and/or the Internet 1518. Embodiments of communications interface 1650 typically include an Ethernet card, a modem (telephone, satellite, cable, ISDN), a (asynchronous) digital subscriber line (DSL) unit, a FireWire® interface, a USB® interface, a wireless network adapter and the like. For example, communications interface 1650 may be coupled to a computer network, to a FireWire® bus or the like. In other embodiments, communications interface 1650 may be physically integrated on the motherboard of computer 1502 and/or may be a software program or the like.

RAM 1670 and non-volatile storage drive 1680 are examples of tangible computer-readable media configured to store data such as computer-program product embodiments of the present invention, including executable computer code, human-readable code or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices and the like. RAM 1670 and non-volatile storage drive 1680 may be configured to store the basic programming and data constructs that provide the functionality of various embodiments of the present invention, as described above.

Software instruction sets that provide the functionality of aspects of the present invention may be stored in RAM 1670 and non-volatile storage drive 1680. These instruction sets or code may be executed by the processor(s) 1660. RAM 1670 and non-volatile storage drive 1680 may also provide a repository to store data and data structures used in accordance with the present invention. RAM 1670 and non-volatile storage drive 1680 may include a number of memories including a main random access memory (RAM) to store of instructions and data during program execution and a read-only memory (ROM) in which fixed instructions are stored. RAM 1670 and non-volatile storage drive 1680 may include a file storage subsystem providing persistent (non-volatile) storage of program and/or data files. RAM 1670 and non-volatile storage drive 1680 may also include removable storage systems, such as removable flash memory.

Bus subsystem 1690 provides a mechanism to allow the various components and subsystems of computer 1502 communicate with each other as intended. Although bus subsystem 1690 is shown schematically as a single bus, alternative embodiments of the bus subsystem may utilize multiple busses or communication paths within the computer 1502.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures and techniques may be shown without unnecessary detail in order to avoid obscuring the embodiments.

Implementation of the techniques, blocks, steps and means described above may be done in various ways. For example, these techniques, blocks, steps and means may be implemented in hardware, software or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded or transmitted via any suitable means including memory sharing, message passing, token passing, network transmission, etc.

For a firmware and/or software implementation, the methodologies may be implemented with modules (e.g., procedures, functions and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile or other storage medium and is not to be limited to any particular type of memory or number of memories or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other storage mediums capable of storing that include or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for delivering content objects over the Internet from a content delivery network to end-user systems, comprising:
    a first server, wherein the first server is configured to:
        receive a request for a content object, wherein:
            the request is to deliver a content object to an end-user system;
            the request is from an end-user system;
            the first server is one of a first plurality of servers in a first content delivery network having a first plurality of points of presence (POPs); and
            the first content delivery network delivers content over the Internet to end-user systems;
        determine that the content object is not cached by the first server;
        determine that the content object is to be requested from an origin server; and
        determine that the first server either has no open connection with the origin server or that the first server has an open connection with the origin server with limited performance; and
    a cache for storing a connection digest, wherein:
        the connection digest tracks connection information of a second server with the origin server;
        the second server is one of a second plurality of servers in a second content delivery network having a second plurality of POPs; and
        the second content delivery network delivers content over the Internet to end-user systems;
    the first server being further configured to:
        query the connection digest; and
        receive from the query a result identifying that the second server has an open connection with the origin server.

2. The system of claim 1, wherein the first server is further configured to:
    transfer the request for the content object to the second server based on the result from the connection digest.

3. The system of claim 1, wherein the first server is further configured to:
    retrieve the content object from the origin server using the open connection of the second server with the origin server.

4. The system of claim 1, wherein the second server is configured to:
    retrieve the content object from the origin server using the open connection of the second server with the origin server.

5. The system of claim 1, wherein the connection digest comprises a database including entries indicating open connections between the origin server and each of the first plurality of servers and/or the second plurality of servers, entries indicating a quality of open connections between the origin server and each of the plurality of servers, entries indicating a TCP window size for open connections between the origin server and each of the plurality of servers or any combination of these.

6. The system of claim 1, wherein the first content delivery network and the second content delivery network are the same or wherein the first plurality of POPs and the second plurality of POPs are the same or wherein the first plurality of servers and the second plurality of servers are the same.

7. The system of claim 1, wherein the first content delivery network and the second content delivery network are federated content delivery networks.

8. A method for delivering content objects over the Internet from a content delivery network to end-user systems, the method comprising:
    receiving a request to deliver a content object to an end-user system, wherein:
        the request is received at a first server;
        the request is received from an end-user system;
        the first server is one of a first plurality of servers in a first content delivery network having a first plurality of points of presence (POPs); and
        the first content delivery network delivers content over the Internet to end-user systems;
    determining that the first server does not have the content object cached;
    determining that the content object is to be requested from an origin server;
    determining that the first server either has no open connection with the origin server or that the first server has an open connection with the origin server with limited performance;
    querying a connection digest, wherein:
        the connection digest tracks connection information of a second server with the origin server;
        the second server is one of a second plurality of servers in a second content delivery network having a second plurality of POPs; and
        the second content delivery network delivers content over the Internet to end-user systems; and
    receiving a result from the query that identifies the second server as having an open connection with the origin server.

9. The method of claim 8, further comprising:
    transferring the request for the content object to the second server based on the result from the query.

10. The method of claim 8, further comprising:
    retrieving the content object from the origin server using the open connection of the second server with the origin server; and
    serving the content object to the end-user system.

11. The method of claim 10, further comprising:
    caching the content object on the first server or the second server.

12. The method of claim 10, wherein the retrieving the content object is performed in a shorter time than a time required for retrieving the content object from the origin server by opening new connection between the origin server and the first server or by using the open connection of the first server with the origin server with limited performance.

13. The method of claim 8, wherein the connection digest comprises a database including entries indicating open connections between the origin server and each of the first plurality of servers and/or the second plurality of servers, entries indicating a quality of open connections between the origin server and each of the plurality of servers, entries indicating a TCP window size between each of the plurality of servers and the origin or any combination of these.

14. The method of claim 8, wherein the first content delivery network and the second content delivery network are the same or wherein the first plurality of POPs and the second plurality of POPs are the same or wherein the first plurality of servers and the second plurality of servers are the same.

15. The method of claim 8, wherein the first content delivery network and the second content delivery network are federated content delivery networks.

16. A computer-program product tangibly embodied in a non-transitory machine-readable storage medium, comprising instructions, that when executed by one or more processors in a computing device, cause the computing device to:
    receive a request to deliver a content object to an end-user system
    determine that the computing device does not have the content object cached;
    determine that the content object is to be requested from an origin server;
    determine that the computing device either has no open connection with the origin server or that the computing device has an open connection with the origin server with limited performance;
    query a connection digest, wherein:
        the connection digest tracks connection information of a second computing device with the origin server;
    receive a result from the query that identifies the second computing device as having an open connection with the origin server;
    transfer the request for the content object to the second server, wherein: the request to deliver a content object is from an end-user system;
        the computing device is one of a first plurality of servers in a first content delivery network having a first plurality of points of presence (POPs);
        the first plurality of servers deliver content over the Internet to end users;
        the second computing device is one of a second plurality of servers in a second content delivery network having a second plurality of POPs; and
        the second plurality of servers delivers content over the Internet to end-user systems.

17. The computer-program product of claim 16, wherein:
    the first content delivery network and the second content delivery network are the same or wherein the first plurality of POPs and the second plurality of POPs are the same or wherein the first plurality of servers and the second plurality of servers are the same.

18. The computer-program product of claim 16, wherein:
the first content delivery network and the second content delivery network are federated content delivery networks.

19. The computer-program product of claim 16, wherein the instructions further comprise instructions configured to cause the computing device to:
retrieve the content object from the origin serve using the open connection of the second computing device with the origin server.

* * * * *